(12) United States Patent
Piersol et al.

(10) Patent No.: US 9,082,105 B2
(45) Date of Patent: Jul. 14, 2015

(54) PAPER-LIKE FORMS PROCESSING SYSTEM AND METHOD

(75) Inventors: Kurt W. Piersol, Campbell, CA (US); Michael J. Gormish, Redwood City, CA (US); John W. Barrus, Menlo Park, CA (US); Edward L. Schwartz, Sunnyvale, CA (US); Kenneth F. Gudan, Sunnyvale, CA (US); Richard D. Kosoglow, Redwood City, CA (US); Stephen R. Savitzky, San Jose, CA (US); Sergey Chemishkian, Cupertino, CA (US)

(73) Assignee: Ricoh Co. Ltd., Tokyo (JP)

( * ) Notice: Subject to any disclaimer, the term of this patent is extended or adjusted under 35 U.S.C. 154(b) by 1249 days.

(21) Appl. No.: 12/555,663

(22) Filed: Sep. 8, 2009

(65) Prior Publication Data
US 2011/0060981 A1    Mar. 10, 2011

(51) Int. Cl.
*G06F 17/21* (2006.01)
*G06Q 10/10* (2012.01)
*G06F 17/27* (2006.01)

(52) U.S. Cl.
CPC ...................................... *G06Q 10/10* (2013.01)

(58) Field of Classification Search
CPC ................ G06F 17/30011; G06F 11/11471; G06F 11/1474; G06F 17/248; G06F 21/6245; G06F 2209/508; G06Q 10/10
USPC .................. 715/200, 203, 209, 234, 243, 248
See application file for complete search history.

(56) References Cited

U.S. PATENT DOCUMENTS

| | | | | |
|---|---|---|---|---|
| 5,631,984 A  * | 5/1997 | Graf et al. | | 382/317 |
| 6,021,202 A  * | 2/2000 | Anderson et al. | | 705/54 |
| 6,230,166 B1 * | 5/2001 | Velamuri et al. | | 1/1 |
| 7,548,877 B2 * | 6/2009 | Palazzo | | 705/26.81 |
| 7,792,753 B1 * | 9/2010 | Slater et al. | | 705/45 |
| 7,822,690 B2 * | 10/2010 | Rakowicz et al. | | 705/75 |
| 8,181,261 B2 * | 5/2012 | Sperry | | 726/28 |

(Continued)

FOREIGN PATENT DOCUMENTS

| | | |
|---|---|---|
| JP | 2004287859 | 10/2004 |
| JP | 2007122091 | 5/2007 |

OTHER PUBLICATIONS

U.S. Appl. No. 11/322,435, filed Dec. 29, 2005, Wolff et al.

(Continued)

*Primary Examiner* — Wilson Tsui
(74) *Attorney, Agent, or Firm* — Patent Law Works LLP

(57) ABSTRACT

A system for paper-like forms processing includes a plurality of portable computing devices coupled by a network to a paper-like forms server. The portable computing devices are adapted to receive images (e.g., compound documents/forms), add stroke annotations to the received images, and send the annotated received images or the stoke annotations themselves to the paper-like forms server. The paper-like forms server comprises a central scheduler and a logging module. The paper-like forms server processes compound documents as paper like forms and sends input to and receives results from service providers to perform various types of paper like processing on the compound document. The paper-like forms server performs the scheduling, routing, logging, verification and billing for the paper-like processing of compound documents. The central scheduler also stores results from service providers for later retrieval.

21 Claims, 11 Drawing Sheets

(56) References Cited

U.S. PATENT DOCUMENTS

| | | | |
|---|---|---|---|
| 8,301,529 B1* | 10/2012 | Anderson | 705/35 |
| 8,332,253 B1* | 12/2012 | Farmer et al. | 705/7.27 |
| 8,370,293 B2* | 2/2013 | Iwase et al. | 707/608 |
| 2003/0212617 A1* | 11/2003 | Stone et al. | 705/30 |
| 2005/0038688 A1* | 2/2005 | Collins et al. | 705/9 |
| 2005/0050439 A1* | 3/2005 | Oresick et al. | 715/500 |
| 2005/0071283 A1* | 3/2005 | Randle et al. | 705/75 |
| 2005/0171811 A1* | 8/2005 | Campbell et al. | 705/1 |
| 2007/0038499 A1* | 2/2007 | Margulies et al. | 705/9 |
| 2008/0040233 A1* | 2/2008 | Wildman et al. | 705/26 |
| 2008/0114791 A1* | 5/2008 | Takatsu et al. | 707/100 |
| 2008/0140667 A1* | 6/2008 | LaBiche | 707/10 |
| 2008/0247629 A1* | 10/2008 | Gilder et al. | 382/137 |

OTHER PUBLICATIONS

U.S. Appl. No. 12/244,714, filed Oct. 2, 2008, Barrus et al.
U.S. Appl. No. 10/887,998, filed Jul. 9, 2004, Wolff et al.
U.S. Appl. No. 12/244,707, filed Oct. 2, 2008, Berkner et al.
U.S. Appl. No. 12/244,721, filed Oct. 2, 2008, Kurt W. Piersol.
Japanese Office Action for Application No. 2010-199675, dated Feb. 12, 2014, 3 pages.

* cited by examiner

PAPER-LIKE FORMS PROCESSING SYSTEM AND METHOD

BACKGROUND OF THE INVENTION

The present invention relates to distributed computing systems. More particularly, the present invention relates to systems and methods for distributing processing between providers and client devices. Still more particularly, the present invention relates to distributed systems that provide paper like form processing.

Much of data processing has historically been performed using paper forms and manual completion and manipulation of such forms. Paper forms are easy to use and require no training. The location of the paper form itself reflects the state of workflow progression that has been completed. Paper also provides a medium upon which unique identifiers such as signatures, comments or sketches may be added. Forms are used ubiquitously throughout most office environments and are a critical part of conventional paper-based processing. However, such paper-based processing is not without its disadvantages. In particular, the distribution of forms especially across large distances and distributed offices is expensive, slow and requires copying. Furthermore, the availability of the paper form is limited, is environmentally unfriendly and the cost for storage of completed forms processed by the workflow can be expensive.

There have been attempts to overcome these disadvantages with computing devices in their various different forms. The landscape of computing devices typically available for many users has changed from a small homogeneous set of computing devices such as desktop computers coupled to a network to a large heterogeneous set of computing devices with significantly varying functionality and computational power. For example, there are any number of computing devices such as but not limited to personal computers, personal digital assistants, smart phones, laptop computers, notebook computers, e-book readers and digital cameras that are coupled for use with networks, servers and peripheral devices. While many of these devices have an ability to communicate over a network whether it be wired or wireless, their ability to interface with service providers or other peripheral devices to implement workflows is significantly limited because each peripheral device requires compliance with different data communication protocols, has its own application interface and data has to be in a format specific to that peripheral and often different from the format of other peripherals.

Other businesses use 'tablet PCs' which are essentially personal computers designed to accept input primarily from a stylus. These devices present the capabilities of a PC, with menus and file folders and arbitrary applications and try to make those capabilities easy to access with a stylus. Sometimes the user interface is customized for a particular purpose, for example, for medical charts. In this case, the user does not need to learn to use a PC operating system, but must still learn the special purpose software. Such devices are typically only useful with the back-end system they were designed to be used with. There are also email systems but they generally do not provide a way to simply annotate documents, and introduce their own problems such as user level password management for secure systems.

Yet another attempt by the prior art to overcome the shortcomings of paper-based form processing has been to provide centralized workflow systems. However, such centralized workflow systems often require that each user log in. These systems also require a significant amount of customized programming. Thus, even the smallest change to a workflow cannot be performed immediately, requires a custom modification by a skilled programmer, and typically introduces significant delay before the centralized system matches the desired workflow. Furthermore, such centralized system workflows do not accommodate arbitrary comments or modification of electronic documents. Typically such systems only provide access when a user is fully connected to the system, and users often take documents out of the central system, use a word processor to edit them and then return them to the system. Such centralized workflow systems make it difficult to create ad hoc workflows or groups especially with "outsiders" i.e. people who are not part of a company or group and especially people who should not be given the same access to all documents as a group member.

SUMMARY OF THE INVENTION

The present invention overcomes the deficiencies of the prior art with a system for paper-like forms processing. The system is particularly advantageous because it provides a unique document structure for processing forms that has logging capabilities. In one embodiment, the system of the present invention includes: a plurality of portable computing devices coupled by a network to a paper-like forms server. The system for paper-like forms processing in another embodiment also includes a computer and one or more service providers coupled to the network. The portable computing devices include a display capability, a stroke capture capability and a wireless communication capability. The portable computing devices are adapted to receive images (e.g., compound documents/forms), add stroke annotations to the received images, and send the annotated received images or the stoke annotations themselves to the paper-like forms server. The paper-like forms server comprises a central scheduler and a logging module. The paper-like forms server also comprises a billing module, a service provider manager and rater, a modification module, a retry module and a verification module. The service providers each have a logging module for local logging as well. The paper-like forms server processes compound documents as paper like forms and sends input to and receives results from service providers to perform various types of paper like processing on the compound document. The system for paper-like forms processing is particularly advantageous because it provides for document processing in a paper like manner without requiring any specialized training of the user. The portable computing devices and the service providers need only minimal modifications to interact with the paper-like forms server. The paper-like forms server performs the scheduling, routing, logging, verification and billing for the paper-like processing of compound documents. The central scheduler also stores results from service providers for later retrieval.

The present invention also includes a number of novel methods including a method for paper-like processing of compound documents, a method for routing compound documents, and a method for modifying a document for processing by a service provider in accordance with the present invention.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF PREFERRED EMBODIMENTS

Figure 1:
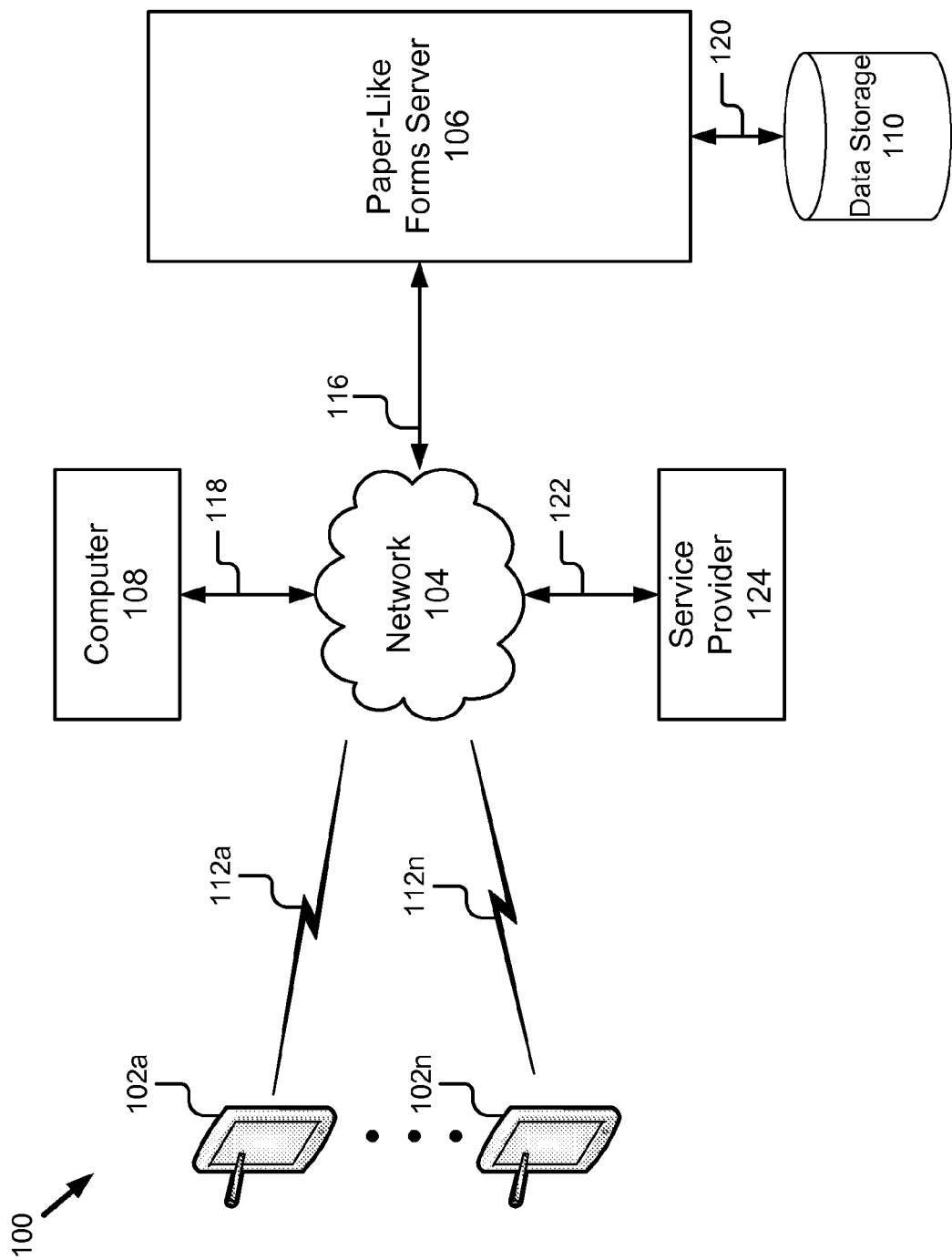
FIG. 1 is a block diagram of an embodiment of a system for paper-like forms processing in accordance with the present invention.

A system for paper-like forms processing is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described in one embodiment below with reference to portable computing devices that are exemplified in a hardware and software platform such as the Amazon Kindle. However, the present invention applies to any type of portable computing device that can capture ink, data and commands, and send documents electronically.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment. In particular the present invention is described below in the content of two distinct architectures and some of the components are operable in both architectures while others are not.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is described without reference to any particular programming language. It will be appreciated that a variety of programming languages may be used to implement the teachings of the invention as described herein.

System Overview

FIG. 1 shows an embodiment of a system 100 for paper-like forms processing. Referring now to FIG. 1, this embodiment of system 100 comprises: a plurality of portable computing devices 102a-102n, a network 104, a computer 108, a paper-like forms server 106, data storage 110 and one or more service providers 124.

The plurality of portable computing devices 102a-102n is wirelessly coupled to the network 104 via respective couplings 112a-112n. In one embodiment, the portable computing devices 102a-102n are portable computing devices including a display, stroke capture capability and a wireless communication capability. The portable computing devices are adapted to receive images (e.g., forms), add stroke annotations to the received images, and send the annotated received images. Embodiments of the portable computing devices 102a-102n will be described in more detail below with reference to FIG. 3. Although this embodiment is described in the context of devices which can write strokes, it is clear that many useful functions, such as reading and document transfer, can be performed without accepting strokes.

The network 104 is a conventional type, wired or wireless, and may have any number of configurations such as a star configuration, token ring configuration or other configurations known to those skilled in the art. Furthermore, the network 104 may comprise a local area network (LAN), a wide area network (WAN) (e.g., the Internet), and/or any other interconnected data path across which multiple devices may communicate. In yet another embodiment, the network 104 may be a peer-to-peer network. The network 104 may also be coupled to or include portions of a telecommunications network for sending data in a variety of different communication protocols.

The computer 108 is a conventional type such as personal computer. The computer 108 is coupled to the network 104 by signal line 118. In one embodiment, the computer 108 accesses and communicates with the paper-like forms server 106 to initially input a form for processing or verify processing of a particular form according to a workflow. For example, a user may use the computer 108 to input to the paper-like forms server 106 a document such as a PDF file for further processing. Similarly, the computer 108 may be the recipient of a completed form after all processing according to its workflow has been completed. Finally, the computer 108 may communicate with a verification module of the paper-like forms server 106 to verify the status or completion of processing of a particular form.

The paper-like forms server 106 is coupled to the network 104 via signal line 116 for communication with the portable computing devices 102a-102n, the computer 108 and the service provider 124. The paper-like forms server 106 is also coupled by signal line 120 to the data storage 110. The paper-like forms server 106 includes a central scheduler 208, a logging module 210, a billing module 212, a service provider manager and rater 214, a modification module 216, a retry module 218 and a verification module 230 (See FIG. 2). The paper-like forms server 106 sends and receives documents from the portable computing devices 102a-102n and the service provider 124, maintains a log for verification, and implements a paper like workflow and processing the documents. This is particularly advantageous because the paper-like forms server 106 implements paper like processing of transactions and handles the overhead of processing electronic documents so that it is invisible to the user.

The data storage 110 is coupled to the paper-like forms server 106 via signal line 120. The data storage 110 is a non-volatile memory device or similar permanent storage device and media. Data storage device 110 stores data and instructions for processor 202 and comprises one or more devices including a hard disk drive, a floppy disk drive, a CD-ROM device, a DVD-ROM device, a DVD-RAM device, a DVD-RW device, a flash memory device, or some other mass storage device known in the art. The data storage 110 is used to store information about workflow processing such as the processing logs. In one embodiment, the data storage 110 also comprises a database for storing data, results, transaction histories and other information for the paper-like forms server 106.

At least one service provider 124 is coupled to the network 104 by respective signal lines 122. The service provider 124 is a computing device of a conventional type such as a server or personal computer and associated software. In some embodiments, the service providers 124 are computer systems that allow human interaction to provide the service offered. One example of service provider is a human user with a personal computer, a smart phone or a computing pad. The service provider 124 is capable of delivering one or more services. While only a single service provider 124 is shown in FIG. 1, those skilled in the art will realize that there may be two or more service providers 124 each providing a different service.

Some of the services that are provided by different service providers 124 include but are not limited to: 1) Recognition services that receive images or strokes and return metadata such as optical mark recognition, machine optical character recognition, optical character recognition with human proofreading, handwriting recognition, barcode recognition/decoding, face recognition and image cleanup or enhancement; 2) Upload services that receive images or strokes and create entries in databases such as archiving, storing document images on a server, storing metadata on a CRM or accounts payable, or accounts receivable database and redundant storage of transactions to another service; 3) Information retrieval services (Public & Private) such as looking up words in a dictionary, looking up stock prices, or looking up addresses in a customer list; 4) Data processing services such as proofreading, language translation, format translation, encryption, decryption, spell checking and correction, grammar checking and correction, test grading, image clean up, survey data aggregation, data mining, remote procedure calling using any of several RPC mechanisms, and registration of legal compliance with time stamping; 5) Advertising services such as those that that match ads to documents; 6) Banking services such as credit card number verification, credit worthiness checking, form completeness verification, retrieval of transaction summaries and monetary transfers, notification messaging; 7) Fraud detection services such as transaction redundancy checking, cheat detection using similarity of inputs, cheat detection using timing of inputs, and transaction pattern recognition to spot suspicious transactions; and 8) Electronic approval services such as signature verification, manager approval, company authorizations, digital signing, etc.

Paper-like Forms Server 106

Figure 2:
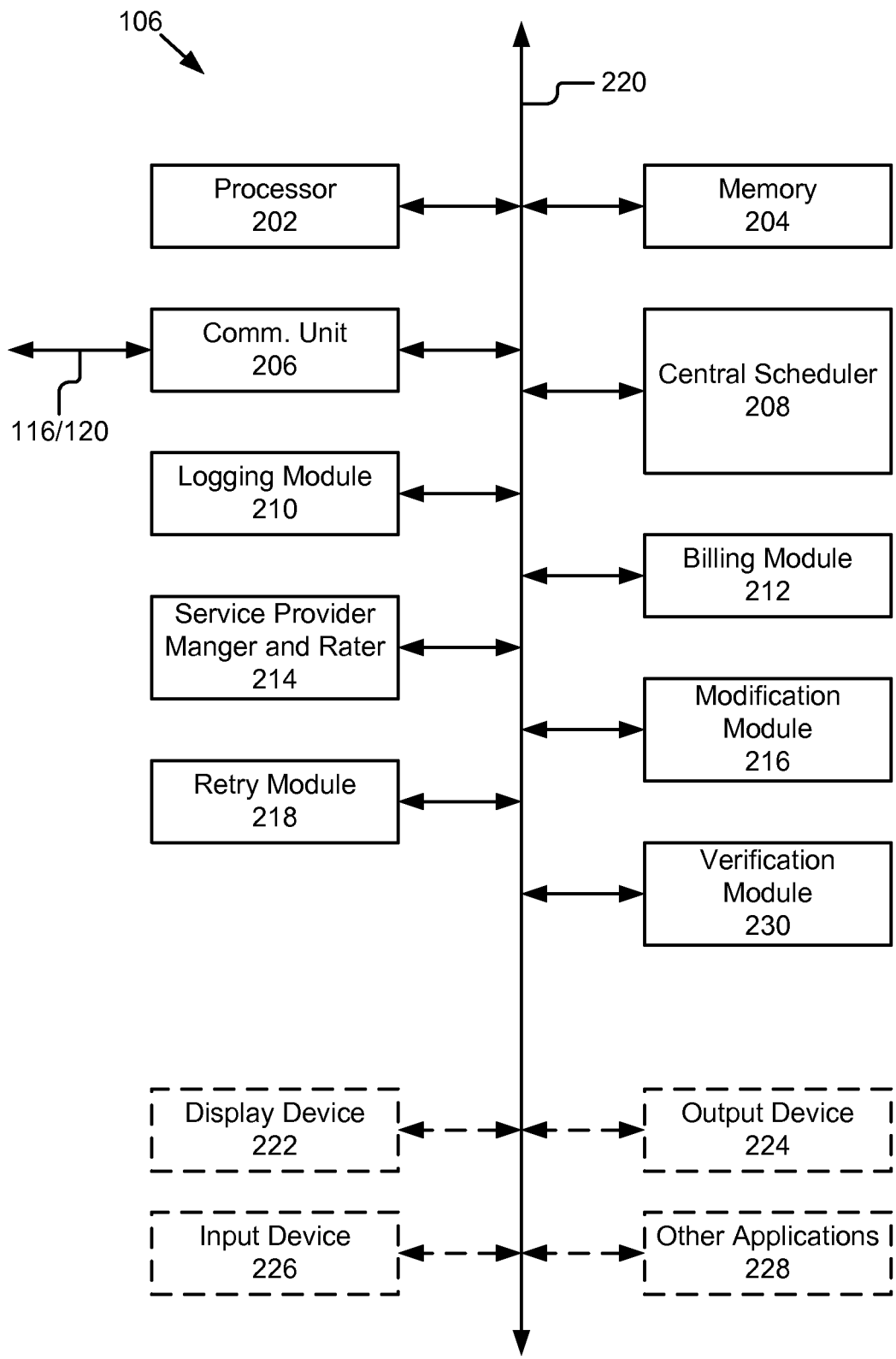
FIG. 2 is a block diagram of an embodiment of a paper-like forms server in accordance with the present invention.

Referring now to FIG. 2, an embodiment of a paper-like forms server 106 is described in more detail. The paper-like forms server 106 comprises a processor 202, a memory 204, a communication unit 206, a central scheduler 208, a logging module 210, a billing module 212, a service provider manager and rater 214, a modification module 216, a retry module 218 a bus 220 and a verification module 230. In an alternate embodiment, the paper-like forms server 106 further comprises a display device 222, an output device 224, an input device 528 and other applications 228.

The processor 202 comprises an arithmetic logic unit, a microprocessor, a general purpose controller or some other processor array to perform computations, provide electronic display signals to display device 222, and perform the paper-like form processing of the present invention. The processor 202 is coupled to the bus 220 for communication with the other components of the paper-like forms server 106. Processor 202 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. It will be obvious to one skilled in the art that other processors, operating systems, sensors, displays and physical configurations are possible. The computing had 202 also includes an operating system executable by the processor such as but not limited to WINDOWS®, MacOS X, or UNIX® based operating systems.

The memory 204 stores instructions and/or data that may be executed by processor 202. The instructions and/or data may comprise code for performing any and/or all of the techniques described herein. The memory 204 may be a dynamic random access memory (DRAM) device, a static random access memory (SRAM) device, flash memory or some other memory device known in the art. In one embodiment, the memory 204 also includes a non-volatile memory such as a hard disk drive or flash drive for storing log information on a more permanent basis. The memory 204 is coupled by the bus 220 for communication with the other components of the paper-like forms server 106.

The communication unit 206 is coupled to signal lines 116, 120 and the bus 220. The communication unit 206 links the processor 202 to the network 104 and other processing systems. The communication unit 206 also provides other conventional connections to the network 104 for distribution of files using standard network protocols such as TCP/IP, HTTP, HTTPS and SMTP as will be understood to those skilled in the art. In an alternate embodiment, the communication unit 206 is coupled to the network 104 or data storage 110 by a wireless connection and the communication unit 206 includes a transceiver for sending and receiving compound documents. In such an alternate embodiment, the communication unit 206 includes a Wi-Fi transceiver for wireless communication with an access point. In another alternate embodiment, the communication unit 206 includes a Bluetooth® transceiver for wireless communication with other devices. In yet another embodiment, the communication unit 206 includes a cellular communications transceiver for sending and receiving data over a cellular communications network such as via short messaging service (SMS), multimedia messaging service (MMS), hypertext transfer protocol (HTTP), direct data connection, WAP, email, etc. In still another embodiment, the communication unit 206 includes ports for wired connectivity such as but not limited to USB, SD, or CAT-5, etc.

The central scheduler 208 is software and routines for processing and routing compound documents. The central scheduler 208 creates compound documents 400 and creates formatted messages. The central scheduler 208 also works with the logging module 210 to create a global transaction log (stored in the logging module 210, the memory 204 or the data storage 110) and publishes or makes available that log as needed. The central scheduler 208 determines transaction steps, selects services providers and routes formatted messages on to the next location (or the next transaction step) as part of a paper-like processing workflow. The central scheduler 208 includes a document transfer module such as an email server for sending compound documents. The central scheduler 208 is also coupled to and interacts with the billing module 212, the service provider manager and rater 214, the modification module 216 and the retry module 218 to send and receive data from these modules and provide information for their respective functions. The central scheduler 208 is responsible for billing, recording all transactions made against the compound document 400, and for choosing which service provider 124 will perform any needed transactions.

The logging module 210 is software and routines for creating and storing global logs of for the transactions processed by the paper-like forms server 106. In one embodiment this global log is stored by the logging module 210 in the memory 204, and more particularly, in a nonvolatile storage portion of the memory 204. In other embodiments, the global log is copied or written directly to data storage 110. In one embodiment the logging module 210 is routines executable by the processor 202 to provide the functionality described below and in FIGS. 5, 6A, 6B, 7 and 8. The logging module 210 is particularly critical to provide verification of processing and completion of transactions. In one embodiment, the logging module 210 also includes routines for publishing or storing in a publicly available location on the network 104 the logs for transactions. The logging module 210 is coupled by the bus 220 to the processor 202, the memory 204, and the communication unit 206. In one embodiment, the logging module 210 includes storage or memory and stores the logs of the actions and processed transactions of the paper-like forms server 106.

The billing module 212 is software and routines executable by the processor for billing a requesting party for processing of transactions that have been completed. In one embodiment, the billing module 212 includes a list of authorized requesting parties, identification numbers, billing addresses and other security information. The billing module 212 also includes similar type information for service providers 124. Each step in the paper-like process is considered a transaction. Each of the transactions includes a price for performing the step and a portion of that price is provided to the service provider 124, and a portion of that price the server 106 retains. The billing module 212 is coupled to the central scheduler 208 to determine the status of transactions. Once the transactions have been processed, the billing module 212 accumulates information regarding the requesting party, the service provider 124 that performed the transaction step, and other information about the process. The billing module 212 then generates statements of credit or debit for the service providers 124 and the requesting parties, respectively. Those skilled in the art will appreciate that a variety of the conventional billing functions can be implemented by the billing module 212 including electronic billing, funds transfer, credit card processing, etc. The billing modules adapted for communication with the central scheduler 208, the processor 202 and the communication unit 206. In another embodiment, the billing module 212 maintains a list or schedule of billing codes that represent transactions. Each of the billing codes can be used in the transaction template 410 to identify the services to be provided and/or completed. In one embodiment, the billing codes have associated parameters for performing the service as well as pre-negotiated prices, and allocations of prices between the service provider 124 and the paper-like forms server 106. Those skilled in the art will recognize that such a billing codes may include additional information such as bulk discounts or special private pricing agreements. In yet another embodiment, the billing module 212 cooperates with the processor 202 and the communication unit 206 to allow updating and editing of the billing schedule consistent with market conditions and other private agreements.

The service provider manager and rater 214 is software and routines executable by the processor 202 for managing the service providers 124, monitoring their completion of transactions and rating them to generate a quality of service values or ensure that they meet quality of service levels. The service provider manager and rater 214 are coupled to the central scheduler 208, the processor 202, the memory 204 and the communication unit 206. The service provider manager and rater 214 cooperate with the central scheduler 208 to select service providers 124 for particular transactions. In certain instances, multiple service providers 124 will be associated with a transaction as a primary, secondary, etc. service provider and serve as backups to each other. The service provider manager and rater 214 also monitor transactions for completion. In the event a transaction fails to complete, the service provider manager and rater 214 evaluates the reasons that the transaction was not completed and gives the service providers 124 associated with the transaction a rating or quality of service measure. The operation of the service provider manager and rater 214 are described in more detail below.

The modification module 216 is software and routines executable by the processor 202 for extracting or modifying content from a compound document 400. In some instances, it is advantageous to control or limit the amount of information that is provided to a particular service provider 124. For example, for highly sensitive or confidential material, is advantageous to provide only the information necessary for a particular service provider to perform the transaction. The modification module 216 is coupled to the processor 202, the memory 204 and the central scheduler 208 to receive a compound document and filtering instructions, and return a modified or redacted version of the compound document 400. The operation of the modification module 216 is described in more detail below.

The retry module 218 is software and routines executable by the processor 202 for monitoring for failures of transactions and restarting them. The retry module 218 monitors for messages from the service providers 124 or the central scheduler 208 that a transaction has failed. In one case, the service provider 124 sends a message indicating that it cannot complete the transaction. In a second case, the central scheduler 208 monitors the time at which the transaction was sent and accepted by the service provider 124. If after a predetermined amount of time the service provider 124 has not return the results of the transaction, the central scheduler 208 sends a timeout failure message to the retry module 218. In a third case, the service provider 124 completes the transaction but the results are poor in quality and/or unacceptable. The retry module 218 is responsible for monitoring the transaction processing, monitoring for failure signals and in response, performing the actions to restart the transaction including identifying another service provider 124, communicating with that service provider 124 and sending that service provider 124 the transaction as a compound document 400, and notify the logging module 210 to update its logs. In some cases, a user determines at a much later time that an operation is incomplete or has failed, and signals the retry module 218 that the form must be retried. The operation of the retry module 218 is right in more detail below.

The bus 220 represents a shared bus for communicating information and data throughout the paper-like forms server 106. The bus 220 may represent one or more buses including an industry standard architecture (ISA) bus, a peripheral component interconnect (PCI) bus, a universal serial bus (USB), or some other bus known in the art to provide similar functionality. Components coupled to processor 202 by system bus 220 include the memory 204, the communication unit 206, the central scheduler 208, the logging module 210, the billing module 212, the service provider manager and rater 214, the modification module 216, the retry module 218, the bus 220, the verification module 230, the display device 222, the output device 224, the input device 528 and other applications 228.

The verification module 230 is software and routines executable by the processor 202 for verifying the processing of transactions of the compound document 400. In one embodiment, the verification module 230 is routines executable by the processor 202 to perform verification as described below in the logging section. The verification module 230 is coupled by bus 220 to the processor 202, the memory 204 and the communication unit 206.

The display device 222 represents any device equipped to display electronic images and data as described herein. Display device 222 may be, for example, a cathode ray tube (CRT), liquid crystal display (LCD), or any other similarly equipped display device, screen, or monitor. In one embodiment, display device 222 is equipped with a touch screen in which a touch sensitive, transparent panel is aligned with the screen of display device 222.

The output device 224 is a conventional type such as LEDs. This output device 224 indicates status of the server 106 such as: 1) whether it has power and is operational; 2) whether it has network connectivity; 3) whether it is processing transactions. Those skilled in the art will recognize that there may be a variety of additional status indicators beyond those listed above that may be part of the output device 224. The output device 224 also includes speakers in other embodiments.

The input device 226 is a keyboard and cursor control. The keyboard represents an alphanumeric input device coupled to processor 202 to communicate information and command selections. The keyboard can be a QWERTY keyboard, a key pad, or representations of such created on a touch screen. Cursor control represents a user input device equipped to communicate positional data as well as command selections to processor 202. Cursor control may include a mouse, a trackball, a stylus, a pen, a touch screen, cursor direction keys, or other mechanisms to cause movement of a cursor.

The other applications 228 include other software and routines executable by the processor 202 for various other types of functionality. In one embodiment, one or more application programs are executed by the processor 202 including, without limitation, word processing applications, electronic mail applications, financial applications, and web browser applications.

Portable Computing Device 102

Figure 3:
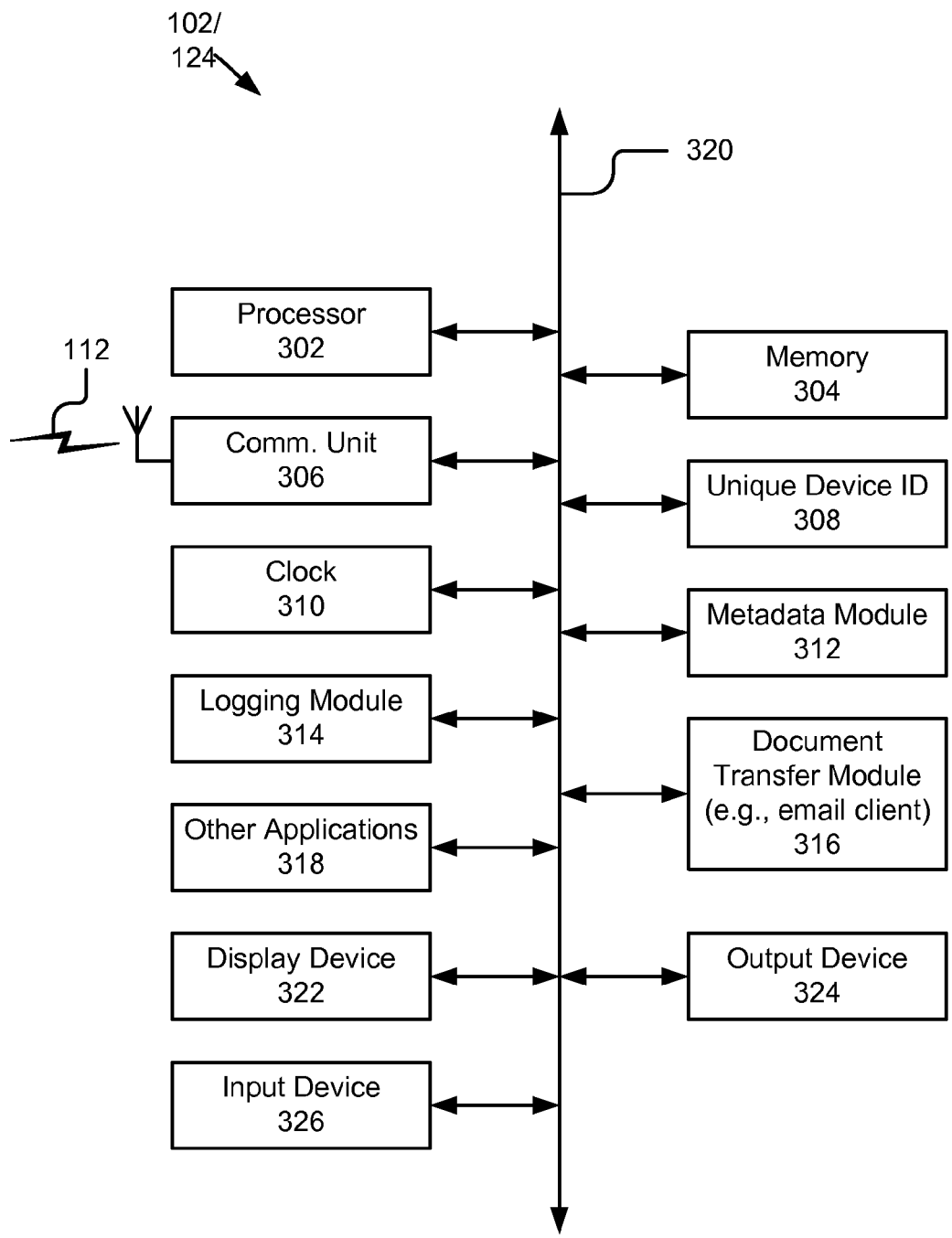
FIG. 3 is a block diagram of an embodiment of a portable computing device in accordance with the present invention.

Referring now to FIG. 3, an embodiment of a portable computing device 102 will be described in more detail. The portable computing device 102 displays an image from a compound document 400 and records any strokes written on the image providing a paper-like interface and user experience. The strokes are typically displayed immediately on top of the image, just as if written by pen on paper. The strokes are also typically captured as a sequence of points or segments. Usually some timing information will be captured with the strokes and sometimes pressure. "Pen up" and "Pen down" may also be recorded with the strokes. In some cases, the stylus may have an identifier or a button or different "ends" and this can also be recorded with the strokes.

The portable computing device 102 comprises a processor 302, a memory 304, a communication unit 306, a unique device identifier 308, a clock 310, a metadata module 312, a logging module 314, a document transfer module 316, other applications 318, a bus 320, a display device 322, an output device 324 and an input device 326.

Those skilled in the art will recognize that some of the components of the portable computing device 102 have the same or similar functionality to the components of the paper-like forms server 106 so descriptions of these components will not be repeated here. For example, the processor 302, memory 304, bus 320 and the other applications 318 are similar to the processor 202, memory 204, bus 220 and other applications 228, respectively. The portable computing device 102 will typically utilize a processor 302, memory 304, and other application 318 designed to consume less power, and thus potentially have lower performance. The processor 302 is also dedicated to perform computations, provide electronic display signals to display device 306, and detect and process stroke inputs.

The communication unit 306 is coupled to an antenna and the bus 320. In an alternate embodiment, the communication unit 306 may provide a port for direct physical connection to the network 104. The communication unit 306 includes a transceiver for sending and receiving compound documents.

In one embodiment, the communication unit 306 includes a Wi-Fi transceiver for wireless communication with an access point. In another embodiment, the communication unit 306 includes a Bluetooth® transceiver for wireless communication with other devices. In yet another embodiment, the communication unit 306 includes a cellular communications transceiver for sending and receiving data over a cellular communications network such as via short messaging service (SMS), multimedia messaging service (MMS), hypertext transfer protocol (HTTP), direct data connection, WAP, email, etc. In still another embodiment, the communication unit 306 includes ports for wired connectivity such as but not limited to USB, SD, or CAT-5, etc. The communication unit 306 links the processor 302 to the network 104 that may include multiple processing systems.

The portable computing device 102 includes storage for a unique device identifier 308. The portable computing device 102 is coupled to the bus 320 to provide the unique identifier to other components of the portable computing device 102 as needed. In one embodiment, the unique device identifier storage is read only memory for storing the unique device identifier 308. In another embodiment, the unique device identifier storage 308 is a nonvolatile storage storing a public key private key pair. It is useful for the portable computing device 102 to have a unique identifier that is used to indicate where strokes were recorded or for various communication protocols. In one embodiment, the unique identifier is the hardware MAC address of a network chip in the portable computing device 102. In another embodiment, the unique identifier is a unique ID associated with a memory card on the portable computing device 102, in that way association with a particular device would move to a different device when the memory card is moved, which might be an expected behavior. Unique identifiers are useful for a variety of operations, but typically do not provide much security. Hardware MAC addresses for example can be imitated by other devices. Thus it is sometimes valuable to have a device associated with a pair of keys from a public key cryptography system, such as RSA. In one embodiment, the portable computing device 102 is manufactured with or configured with a private key and the public key. Then the portable computing device 102 can use its private key for digital signatures of strokes, images, logs, or other media originating on the device. Others may use the public key to verify such media. The public key may also be used to provide secret communication with the device. Use of the device public key for encryption will limit the access of others to page images or metadata intended sole for a particular portable computing device 102.

The clock 310 is a conventional type and provides an indication of local time for the portable computing device 102. In particular, the clock 310 is used to provide a local time at which compound documents are processed. This time value is also stored with data in the local log files using the logging module 314. The clock 310 is adapted to communicate this information to the processor 302 and the logging module 314 using the system bus 320.

The metadata module 312 is software and routines for extracting metadata from a compound document and storing metadata to a compound document. In one embodiment, the metadata module 312 are instructions executable by the processor 302 to provide the functionality described below and with reference to FIGS. 6A-8 for accessing both image/page metadata as well as document metadata. The metadata module 312 is coupled by the bus 320 to the processor 302 and the memory 304.

The logging module 314 is software and routines for creating and storing local logs in the memory 304, and more particularly, in a nonvolatile storage portion of the memory 304. In one embodiment the logging module 314 is routines executable by the processor 302 to provide the functionality described below. The logging module 314 is particularly critical to provide verification that transactions have been completed. In one embodiment, the logging module 314 also includes routines for publishing or storing in a publicly available location on the network the logs of its particular portable computing device 102. The logging module 314 is coupled by the bus 320 to the processor 302, the memory 304 and the communication unit 306.

The document transfer module 316 is software and routines for transmitting and receiving compound documents as a formatted message from any other computing device such as but not limited to the computer 108, the paper-like forms server 106 or other portable computing devices 102. The document transfer module 316 is coupled by the bus 320 for communication with the processor 302 and the communication unit 306. The document transfer module 316 is responsible for transmitting and receiving the compound document 400 from portable computing devices 102 such as by email, file transfer, XMPP or special purpose application. In one embodiment, the document transfer module 316 is an e-mail client that is capable of receiving and sending e-mails having attachments. The e-mail client is operable on the processor 302. Mail servers commonly use either the POP or IMAP protocols to talk to mail clients, and the portable computing device 102 can be configured to use either. The messages might be in a format that the portable computing device 102 can directly use, e.g. an attachment of image files. The messages might require conversion on the portable computing devices 102, e.g. a pdf document. Alternatively, a special server could provide conversion of messages so that the portable computing device 102 does not need to support multiple formats. In the case of multiple devices being used in paper-like process to distribute work that must only be done once e.g. as in the departmental in-box described above, using IMAP is advantageous. Multiple devices 102a-n may be configured as clients with the same IMAP server and 'username.' The group of devices 102a-n might display all forms in the "inbox." Once any user on any device 102a-n marks the form as 'processed' the device moves the message out of the 'inbox' and perhaps into a 'processed' box on the IMAP server. When the other devices 102a-n check the 'inbox' on the IMAP server, they will determine that the pages are no longer present and will no longer display them. When a portable computing device 102 needs to send a page or strokes or multiple pages and strokes, the portable computing device 102 can again act as an email client and send mail, perhaps with the pages in a directory structure that has been compressed.

In a second embodiment, the document transfer module 316 is a routine for performing file transfer. Various file transfer methods can be used to move documents on and off the portable computing device 102. The portable computing devices 102 could run an ftp, http, or webdav server and other devices could push or pull documents on the portable computing devices 102. The portable computing device 102 could also be configured to get or post new documents to an external server, again via ftp, http, rsync, webdav, or another protocol.

In a third embodiment, the document transfer module 316 is a client communication programs such as for communicating via MMS or on other communications protocols. XMPP, a protocol used in instant messaging, is used to provide document and stroke communication with the portable computing devices 102. Instant messaging protocols are useful because any member of the messaging group can initiate a message, even while another member is transmitting a message. For the portable computing devices 102 this could allow a service to transmit an image for the portable computing device 102 at the same time as strokes are being transmitted from the portable computing devices 102 to paper-like forms server 106. Instant messaging protocols can also be useful if a group of portable computing devices 102 is sharing a display space and thus all members of the group may be informed of new strokes.

In a fourth embodiment, the document transfer module 316 is a custom application. Of course, information may be transferred to the portable computing device 102 with special purpose applications designed to work with the portable computing device 102 using a specific API.

The display device 322 is an electronic paper display such as manufactured and sold by E-ink. In other embodiments, the display device 322 is a liquid crystal display (LCD) or any other similarly equipped display device, screen or monitor. The display device 322 represents any device equipped to display electronic images and data as described herein. The display device 322 is sized sufficient to show at least a small 'page' of information. In different embodiments, the display is binary (only two different values for pixels), monochrome (multiple shades of one color), or allows multiple colors and shades. The display device 322 is preferably a light-weight, low-power display. In one embodiment, the display device 322 uses reflective light rather than emitting light—this choice uses less power and provides better outdoor readability. The display device 322 also has high resolution for displaying information that might otherwise be displayed on paper, but the device display device 322 tolerates update speeds much lower than the 60 Hz refresh rates common with LCD displays.

The portable computing device 102 includes an output device 324 such as a series of LEDs. This output device 324 indicates status of the device such as: 1) whether the portable computing device 102 has power and is operational; 2) whether the portable computing device 102 has network connectivity; 3) whether the portable computing device 102 is sending or receiving a compound document; etc. Those skilled in the art will recognize that there may be a variety of additional status indicators beyond those listed above that may be part of the output device 324.

The input device 326 is a stylus, a stroke capture device and/or input buttons. Above or about the periphery of the display device 322, there is a stroke capture device such as a digitizing tablet or graphics pad. The stroke capture device is capable of accepting strokes from the stylus or a finger or other implement. The stroke capture device is a sensor for the stylus and has resolution sufficient to capture recognizable handwriting and printing and other drawings. In one embodiment, display device 322 is equipped with a touch screen in which a touch sensitive, transparent panel covers the screen of display device 322. In one embodiment, the stroke capture device is a digitizer manufactured and sold by Wacom Co., Ltd. In another embodiment, the stroke capture device includes simple sensors that return horizontal and vertical position of a single point of contact. In yet another embodiment, the stroke capture device is a plurality of more complex sensors that return an indication of pressure, location, time, and even a stylus ID number or type or indication if a button is pressed on a stylus or the stylus has been inverted, e.g. to erase. Some sensors might return multiple points of contact. The stroke capture device is either part of or adapted to communicate with the processor 302.

The input device 326 includes a plurality of input button to input commands. For example, a first button when selected initiates the display of a compound document on the display device 322 of the portable computing device 102. A second button when selected indicates that annotation is complete and the compound document should be sent by the portable computing device 102. A third button allows the portion of a form that is being displayed to be moved within the display area of the display device 322. This third button allows the user to center the form or focus on other areas of the form and center them within the display area of the display device 322. A fourth input button allows the user to transition to a next page of a compound document. Those skilled the art will recognize that these input buttons are merely one embodiment for the input device 326 and that various other configurations of fewer or more buttons or input devices are within the spirit and scope of the present invention. More specifically, in another embodiment, the portable computing device 102 has very few (or no) buttons because buttons may interfere with the device being perceived as paper-like. In such an embodiment, strokes and other metadata will be continuously transmitted as long as there is network connectivity. The completion of a page or set of pages might be indicated by pressing a 'submit' or 'reject' button on the pad, or there may be regions on the displayed page and adding strokes to those regions may cause submission of the appropriate data.

Finally, the portable computing device 102 may include one or more other I/O devices (not shown). For example, the other I/O devices 326 may include speakers to produce sound, microphones to record sound, a scanner or camera to record documents or images, and other sensors or feedback devices like accelerometers, pager motors, or haptic feedback. Optionally, the other I/O devices may include one or more analog-to-digital or digital-to-analog converters, and/or one or more digital signal processors to facilitate audio processing. These other I/O devices are coupled by bus 320 for communication with the processor 302 and the memory 304.

Compound Document 400 Format

The present invention utilizes a compound document 400 to provide a paper like experience for the user. In particular, the compound document format enables rapid display of images on the portable computing device 102, storage of stroke data created on the portable computing device 102, and storage of log information to enable verification of the operations performed on the portable computing device 102. In one embodiment, the basic structure of the compound document 400 is a directory of files. Inside the directory are a series of page images, as well as optional metadata. The metadata may be associated independently with each page, and/or metadata may be associated with the document as a whole. Such metadata is stored in further nested directories, and is optional.

Figure 4A:
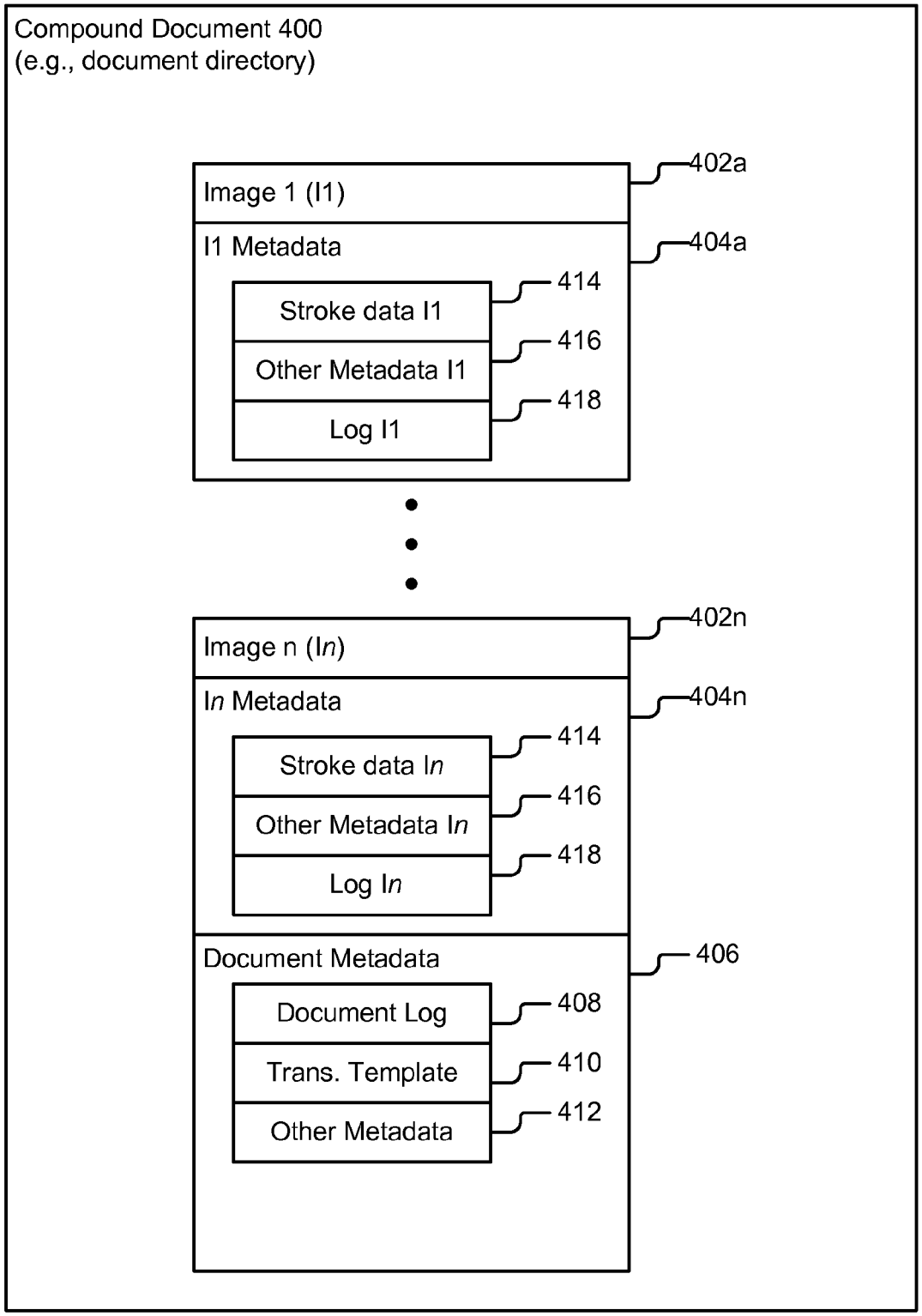
FIG. 4A is a block diagram representing an embodiment of a compound document in accordance with the present invention.

Referring now to FIG. 4A, a graphic representation of the basic structure of the compound document 400 is shown. The compound document 400 as noted above is a directory including one or more files and directories. This is represented in FIG. 4 as the outermost box. In this example, the compound document 400 includes a plurality of images 402a-402n that are denoted in the figure as Image 1(I1) . . . Image n (In). The present invention advantageously stores the pages of the compound document 400 as images. This is particularly advantageous because it avoids requiring that the computing pad tool support a wide range of document formats. Providing pure images, i.e. not documents requiring rendering, to the portable computing device 102 ensures a consistent view and eliminates problems with inability to render fonts or other graphical commands. In one embodiment, the images are in one of the following file formats: JPEG, JPEG2000, JPM, PNG, PDF, TIFF or simple PBM (portable bit map) file format. As will be described below, part of the process for creating a compound document 400 includes rendering documents and other formats to one of these simple image formats before the image is received by the portable computing device 102 or on the portable computing device 102. As noted above, the use of basic and simple images eliminates computation on the portable computing device 102 and insures consistent display. Those skilled in all will recognize that the compound document 400 directories can be transferred and stored as standard ZIP format archives.

In one embodiment, the main pages of the compound document 400 are stored at the top level of the directory. The name segment (up to the initial ".") must be unique to that page. In one embodiment, pages are named using UTF-8. Pages may be ordered by sorting the initial name segments into ascending order, using the raw bytes of the UTF-8 representation. In some cases, applications may use document level metadata to allow reordering of pages without changing the names.

Figure 4B:
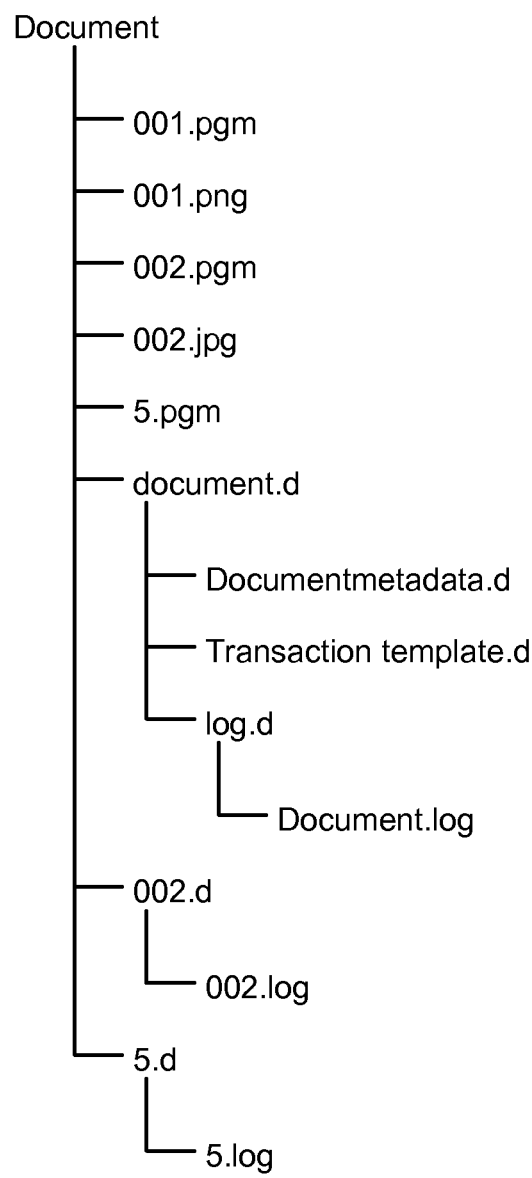
FIG. 4B is a diagram representing one example of a compound document in accordance with the present invention.

Multiple page image files which share the same initial name segment are considered to be alternate representations of the file, of equivalent quality, and the presentation module 322 may choose the representation most convenient for its use. So, for example as shown in FIG. 4B, a directory with the following contents: 001.pgm, 001.png, 002.pgm, 002.jpg and 5.pgm would yield a document with three pages. The first page is represented by one of two files, 001.pgm or 001.png. The second page is represented by one of two files, 002.jpg or 002.pgm, and the third page is represented by 5.pgm. In one embodiment, a segment of the name can be used to specify the resolution or size of any image to allow a device to easily choose an image. For example, there might be images page001.600×800.pgm and page001.cif.pgm where 600×800 or cif (Common Intermediate Format) identifies the resolution of the images.

Each of the plurality of images 402a-402n includes associated page or image metadata 404a-404n. The page or image metadata 404a-404n includes stroke data 414, other metadata 416 and log data 418. Furthermore, the entire compound document 400 includes document metadata 406. The document metadata 406 includes a document log 408, a transaction template 410 other document metadata 412.

The metadata for the compound document 400 is represented by files stored in directories, which are associated with either the document as a whole or with individual pages. In one embodiment, the metadata directories have the suffix ".d" as the final pair of characters in the directory name. (For example, See FIG. 4B) Information within a metadata directory is stored in a file or subdirectory, which is expected to have a unique name segment. Organizations are encouraged to name them using unique identifiers—for example, the traditional Java reversed domain name method. A metadata directory may itself contain subdirectories, whose contents are ordered and defined according to the creator of that directory. General policy is that applications which do not understand the contents of a metadata file or directory should preserve the contents and should not alter it. A given metadata file or directory is self contained, there should are not any dependencies between items of metadata unless they are contained in the same directory. Items of metadata are connected either to the document as a whole, or a specific page.

In one embodiment, the document metadata 406 is global metadata and is stored in a directory named "document.d" containing one or more files. This directory is included at the top level directory. (For example, See FIG. 4B) It is useful to store a log of actions associated with a document in the document metadata. In one embodiment, the system 100 also stores a version of an "original" document as document metadata. For example if the compound document was formed from a PDF, Microsoft Word, Microsoft Excel or other document, the original format document may be saved in the metadata directory.

In one embodiment, the page or image metadata 404 is named with the same name segment as the page image, and ends in the extension ".d". For example, if the page image is named "page.001.jpg", the page metadata directory should be named "page.001.d" to indicate that it is associated with that page. Additional examples are shown in FIG. 4B. In another embodiment, the page or image metadata 404 includes the original image in some format for each page in the page metadata directory. This metadata is created as soon as the compound document 400 is created e.g. by storing a raster format both at the top level directory and in the page metadata directory, or a copy of the original raster format may be stored when the page image is first changed. In other embodiments, the page or image metadata 404 includes log data 418 as will be discussed in more detail below. This log data 418 represents a log for changes applied to each page in the metadata directory for the page. The other metadata 416 is used to store any other data related to a particular page or image. For example, if images are added to a page, it is useful to store these added images in the page metadata directory 416. An image might be added to a page for reasons similar to "stamping" a paper page, e.g. "received" or "submitted" thus providing a visual indication of the status of the page to any reader.

The stroke data 414 stores stroke information for any strokes that are applied to a page in the page's metadata directory 404. This is the most important information captured by the portable computing device 102. In the simplest form, a stroke is just a list of x-y locations where the stylus, pen or other pointing device, like a finger, was sensed. This information is associated with the background image that was showing when the strokes were written and it should be possible to scale and orient the strokes so that it is later possible to match what the user saw. In addition to the x-y locations, it can also be valuable to capture the time of each stroke or each point, the pressure of the stylus, which stylus was used or which end of a stylus was used (if the hardware supports this). It may even be useful to store information about the algorithm being used on the pen to convert pen strokes into pixels e.g., what width and color pen are lines being drawn in, and how are points selected between sensed points.

This information about strokes can be stored in a variety of ways. In a first embodiment, it is stored as simple text based lists comprising an x-value, a space, a y-value and a line feed, with the end of a stroke indicated by a point outside the drawable space, e.g. (−1,−1). For example, the pad might allow x coordinates between 0 and 1200 and y coordinates between 0 and 1600, a point recorded as "−1, −1" is not in the drawable space and can be used to terminate the stroke. In a second embodiment, strokes are stored as using a binary storage technique allocating the appropriate number of bits or bytes to each point, e.g. 2 bytes per x coordinate and 2 bytes per y coordinate, this is more memory efficient. In a third embodiment, the stroke data is stored as InkML. InkML is an XML format that allows storage of strokes and a variety of additional data, specified by the W3C and is described in the technical report, Ink Markup Language (InkML), W3C Working Draft 23 October 2006. InkML allows some memory efficiency as well, and if necessary the data can be compressed by a text compressor.

The transaction template 410 is a standard metadata item of the compound document 400. The transaction template 410 either includes a list of service transactions or is a URL pointing to a description of service transactions. When the compound document 400 is to be processed by the central scheduler 208, then the transaction template must be attached to the compound document 400. Over the life of the compound document 400, more than one transaction template, and the associated processing, might be applied. The most recent transaction template is always used for processing. The transaction template includes a list of entries, each of which is defined as follows: 1) a step identifier including: an input type, an output type, and a preferred service provider.

The Step Identifier is a string which uniquely identifies the particular processing step. For example, it might simply be the numeral string "001" or it might be a more descriptive string "handwriting recognition step". It MUST be unique within the scope of the transaction template. Input types and output types identify which formats of information are needed by the service and must be included in the compound document 400. Both input types and output types are lists of type specifications. These type specifications are unique identifiers for data in a certain format performing a certain role. Each type specification includes a pair of strings identifying the format and role of the information. The format field SHOULD contain an ACCEPTED RFC822 MIME type. The role field is another string identifier, and should contain a globally unique identifier for a role, agreed upon by providers and customers. An example of a complete type specification might be format: "Text/plain" role: "Recognized Handwriting." It should be obvious to one skilled in the art that many other fields of information might be added to a transaction template entry. For example, instead of specifying a particular vendor, the step might specify the cheapest vendor from an approved list. Another embodiment might specify the cheapest service provider whose quality meets an acceptable rating threshold based on customer feedback rankings. The format field of a type specification includes one MIME type, or might contain a list of such types. In such a case, any of the listed types is considered acceptable by the service provider. An input type list might contain one of more of the type specifications described above. In such case, the service provider 124 wishes to receive all of the listed types included in the compound document 400. A special type specification (special because this information is not represented in the metadata) represents the base page images for the document. This type specification should look like: format: "image/jpeg, image/jp2, image/tiff, image/gif, image/x-portable-anymap, image/x-portable-bitmap, image/x-portable-graymap, image/x-portable-pixmap" role: "edo.baseimage"

Log files 408, 418

A particular advantage of the present invention is the ability to verify the actions performed by the portable computing devices 102 or the paper-like forms server 106. The ability to verify actions is enabled by the creation and maintenance of log files 408, 418. The present invention creates a log or log file 408, 418 with a set of entries that describe changes made to a compound document 400. The present invention records any actions instigated by a human on a portable computing device 102 which resulted in a changed appearance to the displayed document. Since the portable computing device 102 is used to allow humans to write on a image as if it was paper, it is useful to record what writing was done on what image or pages at what time on what device and if known by whom and in what location. The present invention utilizes log files 408, 418 with two important properties: 1) sufficient information is referenced by the log 408, 418 to recreate the state of the document, at minimum its visual appearance at the point of log writing and 2) the log file is "tamper evident."

The present invention generates logs 408, 418 that are tamper evident by maintaining a sequence of cryptographic hashes of log entries. The cryptographic hashes associated with each log entry hash data including the cryptographic hash of the previous log entry. Storing or publishing the cryptographic hash provides a checksum for all previous entries in the log. Thus if the published hash is "trusted" then it is possible to re-compute all previous log hashes and see if the same final hash results. Changes to any part of the log or any of the data that was hashed to make a log entry can be detected. The format and details for hash computation and verification of such logs and log entries are described in co-pending U.S. patent application Ser. No. 11/322,435 filed on Dec. 29, 2005, titled "Coordination and Tracking of Workflows;" U.S. patent Ser. No. 12/244,714, filed on Oct. 2, 2008, titled "Method Apparatus for Tamper Proof Camera Logs;" and U.S. patent application Ser. No. 10/887,998, filed on Jul. 9, 2004 and titled "Synchronizing Distributed Work Through Document Logs," which are incorporated by reference in their entirety. The cryptographic hashes are also called content based identifiers (CBIs) because they can be used to index data in addition to use for verification. The publication of the most recent cryptographic hash can be to other trusted logs or via email as described in U.S. patent application Ser. No. 12/224,707, filed on Oct. 2, 2008, titled "Method and Apparatus For Risk Analysis of Entangled Logs" and U.S. patent application Ser. No. 12/244,721, filed on Oct. 2, 2008, titled "Method & Apparatus for Automatically Publishing Content Based Identifiers" which are incorporated by reference in their entirety. Thus logs containing cryptographic hashes or content based identifier (CBI) are maintained. The content based identifier (CBI) of the recent log entries are stored in other log files and published via email or other protocols. These CBIs can later be used to verify that the log was not modified since the time the CBI was published.

Maintaining logs 408, 418 which allow recreation of the document at any point is done by storing the type of operation performed on the document and the CBI for any data needed to redo the operation in the log file. The data itself is stored in metadata directories 404, 406 for the page and document.

The logging module 210, 314 stores information about visual changes on a page such as: page creation, writing on a page, and adding an image to a page. The logging module 210, 314 also stores when a page is submitted or otherwise copied from the portable computing device 102 to another place. When a page is created, a raster form of the image is saved in the metadata directory 404 for the page. The page log 418 is initialized with a 'start log entry.' The start log entry includes the current time as measured on the portable computing device 102 and might include a CBI from another log to establish that the page was created after the time of that CBI (this is a 'freshness hash'). In addition to the 'start log entry,' the logging module 210 stores a 'page created' entry that includes the hash of the raster form of the starting image.

If the CBI of the page log 418 is published after the page is created, then it is possible to use that CBI to check if the page log 418 has been tampered with. If the page log 418 has not been modified, then the steps in the log 418 can be followed. At first the only entry is the 'page created' entry. The CBI for the page image can be checked, and if it matches the raster image in the page metadata directory 404, then the format of the initial page is known not to have been tampered with since creation.

When strokes are added to page, they are displayed in raster format on the display device 322, and they are stored in a stroke file 414 in the metadata directory 404 for the page. A log entry is added to the page log 418, typically including the time and the CBI for the stroke file 414. Thus at a later point, if the log 418 is verified, then the stroke file 414 can be verified and the background image can be verified, if all of these items have not been modified then the stroke file 414 can be used to redraw the strokes on the background image, thus recreating the page as it looked after strokes were added.

Note that to maintain pixel accuracy, the present invention uses a known algorithm to convert the stroke file 414 to pixels. If multiple algorithms are used, or an algorithm is used with some parameters, e.g. stroke width, then the entry for 'strokes added' should include information identifying the exact algorithm used and the parameters to that algorithm.

Just as strokes may be added to a page, images may be added to a page. In this case the image added to a page should be stored in raster format in the page metadata directory 404. The operation 'image added' and the location where the image was added to the page, e.g., (500,300) should be stored in the log 418, along with the CBI of the raster form of the image.

Many "applications" can operate on the portable computing device 102 that only update pages by adding images or adding strokes. If additional changes are made to the page then log entries for these operations must be defined, the name of the operation must be stored in the log 418, and the hash of the data must be stored in the log 418. When a log entry is added to a log 418 the unique identifier 308 of the portable computing device 102 is included in the entry. If a device is configured with a private key, then it might provide a digital signature of the stroke file 414 to indicate that the stroke file 414 was captured on that portable computing device 102. This signature is included in the log 418.

Just as a page log 418 is created in a metadata directory 404 when a new page is created, the logging module 210 creates a document log 408 in the document metadata directory 406 when a document is formed. This document log 408 is used to record items including the addition of pages to a document, when pages are viewed, and when the document as a whole is submitted. Also changes to document level metadata 406 are recorded in this document log 408. While it is possible to repeat the information stored in a page log 418 in the overall document log (along with a page identifier), the logging module 210, 314 records just the CBI for the last entry in page log 418 when the page log 418 is updated. By storing the CBI from the page log 418 in the document log 408, the document log 408 is used to verify all the page logs 418. The CBI from the document log 408 is then published by email or other method, rather than needing to publish information from each individual page log 418.

Entries in the document log 408 are similar to the page logs 418: they should include an 'operation' and the CBI of any data necessary to complete the operation. In the case of a page view, the log entry includes the identifier for the page, along with the CBI of the current raster format of the page image. Note that some log formats allow the direct inclusion of text and CBIs in the same log entry, while other log formats only allow CBIs. In the event the log format only allows CBIs, the text for the 'operation' is stored in file in the document metadata directory 406 and the CBI of that file included in the log. When the 'operation' has no parameters, e.g. 'strokes added' then the same file with the text of the operation can be stored once in the metadata directory and the CBI used multiple times. Of course the CBI of the actual stroke file is expected to differ in most cases.

Processing by the Central Scheduler 208

Depending on the embodiment, this functionality is performed either by the central scheduler 208 of the paper-like forms server 106 or by the processor 302 of the portable computing device 102. For convenience and ease of understanding, it is described below as being performed by the central scheduler 208; however, those skilled in the art will recognize that alternatively the same or some of the operations may be performed by the processor 302 of the portable computing device 102.

In one embodiment, the portable computing devices 102 or the computer 108 are configured to work with a particular paper-like forms server 106 and submit a page, image or compound document 400 to the paper-like forms server 106. This submission begins paper-like processing managed by the central scheduler 208 of the paper-like forms server 106. The paper-like forms server 106 then determines the next step based on preprogrammed rules.

In another embodiment, the paper-like processing is specified in the compound document 400 or in the email (formatted message) in which the compound document 400 was sent. In the simple case of receiving a compound document 400 by email, the portable computing device 102 returns the annotated compound document 400 by email to the sender of the compound document 400 (e.g., the paper-like forms server 106). In such an embodiment, the compound document 400 is routed through the paper-like forms server 106 for every step or transaction the process workflow. In another embodiment, the compound document 400 is sent to the address specified in the "Reply-To:" email header if one is provided, just as would happen if "Reply" was selected in typical email clients. In the case, where this is a service provider 124 or another portable device 102, a copy of the message is sent to the paper-like forms server 106 for billing, logging and tracking. For email, this can be cc of the email or just another reply to addressee. Most email clients enable the sender to specify a "Reply-To" address. This allows one person to fill out a form and send it to a different portable computing device 102 with the "Reply-To" header set to the next person/device/location that should see the compound document 400 after it has been approved by the user of the portable computing device 102. For example, an employee can fill out a travel request form, email the form to their manager's portable computing device 102, with the reply-to set to the travel coordinator. If the manager approves the travel request and submits the form, it will automatically be routed to the next step without any need for the next email address to be entered on the portable computing device 102. In a similar manner, the "Reply-To" header is set to send a copy to the central scheduler 208 if the paper-like forms server 106 for processing as will be described in more detail below.

The use of the "Reply-To" header allows one step of the workflow to be done without the need to enter an email address. To allow more than one step workflows, additional mail headers could be defined. For example an email might include headers as follows:

X-Workflow-1: manager_pad@example.com, scheduler@server.com
X-Workflow-2: director_pad@example.com, scheduler@server.com
X-Workflow-3: vp_pad@example.com, scheduler@server.com
X-Workflow-4: travel_arrangements@example.com, employee@example.com, scheduler@server.com Where manager_pad@example.com is the email address of the employee's manager, scheduler@server.com is the email address of the central scheduler 208, director_pad@example.com is the email address of the director whose approval is needed, vp_pad@example.com is the email address of the vice-president whose approval is needed, and travel_arrangements@example.com is the email address of the travel coordinator.

In this multiple step workflow embodiment, the portable computing devices 102 are configured to examine email headers for workflow steps, determine the current step, and when the form is completed forward it and copy the central scheduler 208, with all workflow email headers to the next step. The example above allows multiple portable computing devices 102 to be used to collect document signatures, and then the signed form is sent to someone to arrange for travel and also back to the employee who started the workflow. This allows the employee to have a copy and know when the travel has been approved. The employee could list their address at every step as a way to track the form, as is the central scheduler's 208.

In one embodiment, the formatted message used to send the compound document 400 includes parameters in the email headers for either the portable computing device 102 or for a service provider 124. For example, if strokes are sent to a handwriting recognition service, it might be useful specify a language, or to indicate that some of the strokes are 'numeric' rather than arbitrary characters. The following is one example of email headers indicating a workflow with a portable computing device 102 having an email address manager_pad@example.com and the service provider 124 having email address mark_recognition@example.com:

X-Workflow-1: manager_pad@example.com, scheduler@server.com
X-Workflow-2: mark_recognition@example.com, scheduler@server.com
X-Workflow-2-parameters: language=English & marks=true In this example, the parameters are attribute-value pairs and here specify that the language is English and the strokes as including numeric characters.

In an alternate embodiment, HTTP headers could be used instead of or in addition to e-mail headers. If the compound documents are transported by HTTP, similar information is inserted to support multiple steps in the HTTP headers. In this case, the next step might be a URL to deliver the document to rather than an email address. For example, there might be a line like: "X-Workflow-4: http://www.example.com/travelrequest.cgi" in the email header. In this case, when step 3 is complete instead of using email protocols, the current compound document 400 is sent via an http post command to the URL in the workflow step. Of course if HTTP is being used for document transport, in one embodiment, the formatted message including the compound document 400 is returned to the paper-like forms server 106 before being sent to the next stage. This allows the paper-like forms server 106 to keep track of the status of the workflow, and allows integration with a content management system or other line of business application.

If the documents are being transported in a manner that supports page images, strokes, and metadata, then the metadata includes the workflow instructions and status. Again, in the simple case, the metadata includes a list of email address and the current step of the workflow. For the compound document 400 described above, this workflow information could appear in a page metadata directory 404 or a document metadata directory 406.

Methods

Figure 5:
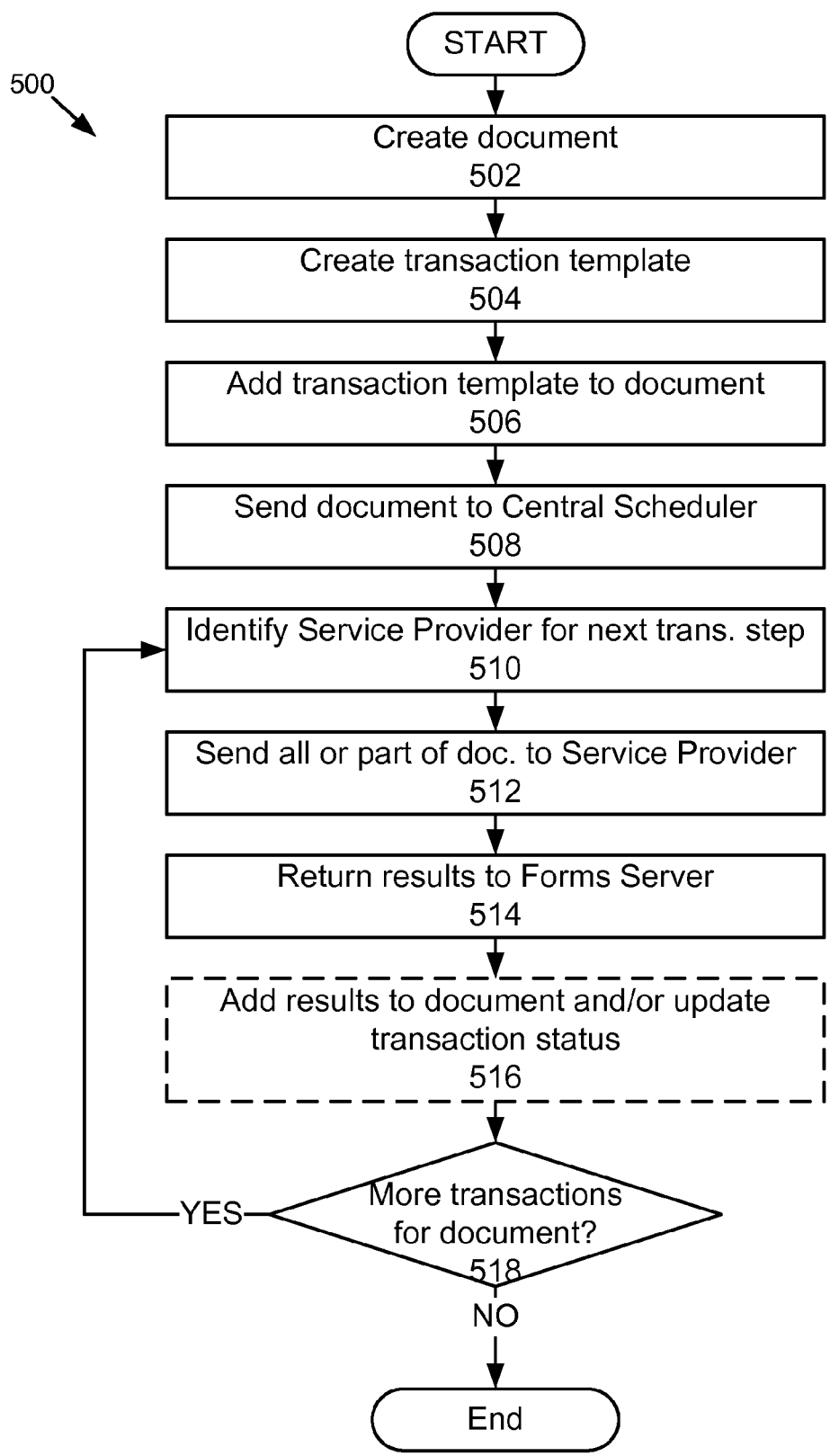
FIG. 5 is a flowchart of an embodiment of a method for paper-like forms processing in accordance with the present invention.

FIG. 5 is a flow chart of one embodiment of a method 500 of paper-like forms processing in accordance with the present invention. The method 500 begins when the paper-like forms server 106 (hereafter "server 106") receives 602 an image or group of images. The server 106 then creates 502 a compound document 400. The compound document 400 includes images and metadata as have been described above with reference to FIG. 4. Those skilled the art will recognize that this can also done at any one of the portable computing devices 102, the computer 108 or the service provider 124. Next the method creates 504 the transaction template 410 and adds 506 it to the compound document 400. As has been noted above, the transaction template 410 is part of the document metadata 406. The transaction template 410 specifies the steps or transactions of paper-like processing that will be performed on the compound document 400. In one embodiment, the central scheduler 208 provides a variety of existing transaction templates 410 of which the user may select based on the function being performed on the images, and the quality of the service providers 124 or selection of specific service providers 124. In another embodiment, a user interface is generated and displayed to allow the user to add transactions or steps to the transaction template 410. Once the transaction template 410 has been added 506 to the compound document 400, the compound document 400 is sent 508 to the central scheduler 208 for processing. The central scheduler 208 then identifies 510 the service provider 124 and the next step in the transaction specified in the transaction template 410 of the compound document 400. The central scheduler 208 next sends 512 all or part of the compound document 400 to the service provider 124. In one embodiment, the entire document 400 is sent to service provider 124. In another embodiment, only the portions that the service provider 124 requires to perform this transaction are sent to the service provider 124. The compound document 400 is modified by the modification module 216 by removing portions of the compound document 400 that are not necessary for the particular transaction step and sending a modified version. The modification module 216 also retains a copy of the compound document in its original form so that when results are returned from the service provider 124 they can be added to that copy to create a compound document 400 that includes information that was not sent to the service provider 124 as well as the results returned from the service provider 124. This is advantageous because it reduces the amount of data that must be sent between the server 106 and the service provider 124. The service provider 124 processes the compound document 400 and returns 514 the results to the paper-like forms server 106. In one embodiment, the method 500 adds 516 the return results to the compound document 400 and/or updates the transaction status in the metadata 406 of the compound document 400. In other embodiments, the results are sent to device that initiated the transaction. As shown in FIG. 5, this step 516 is optional as indicated by dashed lines. Next, the method 500 determines 518 whether there are more transactions that require processing for the compound document 400. If so, the method 500 returns to step 510 and repeats steps 510-518 for the next transaction in the transaction template 410. If not, the paper-like processing of this compound document 400 is complete, and the method ends.

Figure 6A:
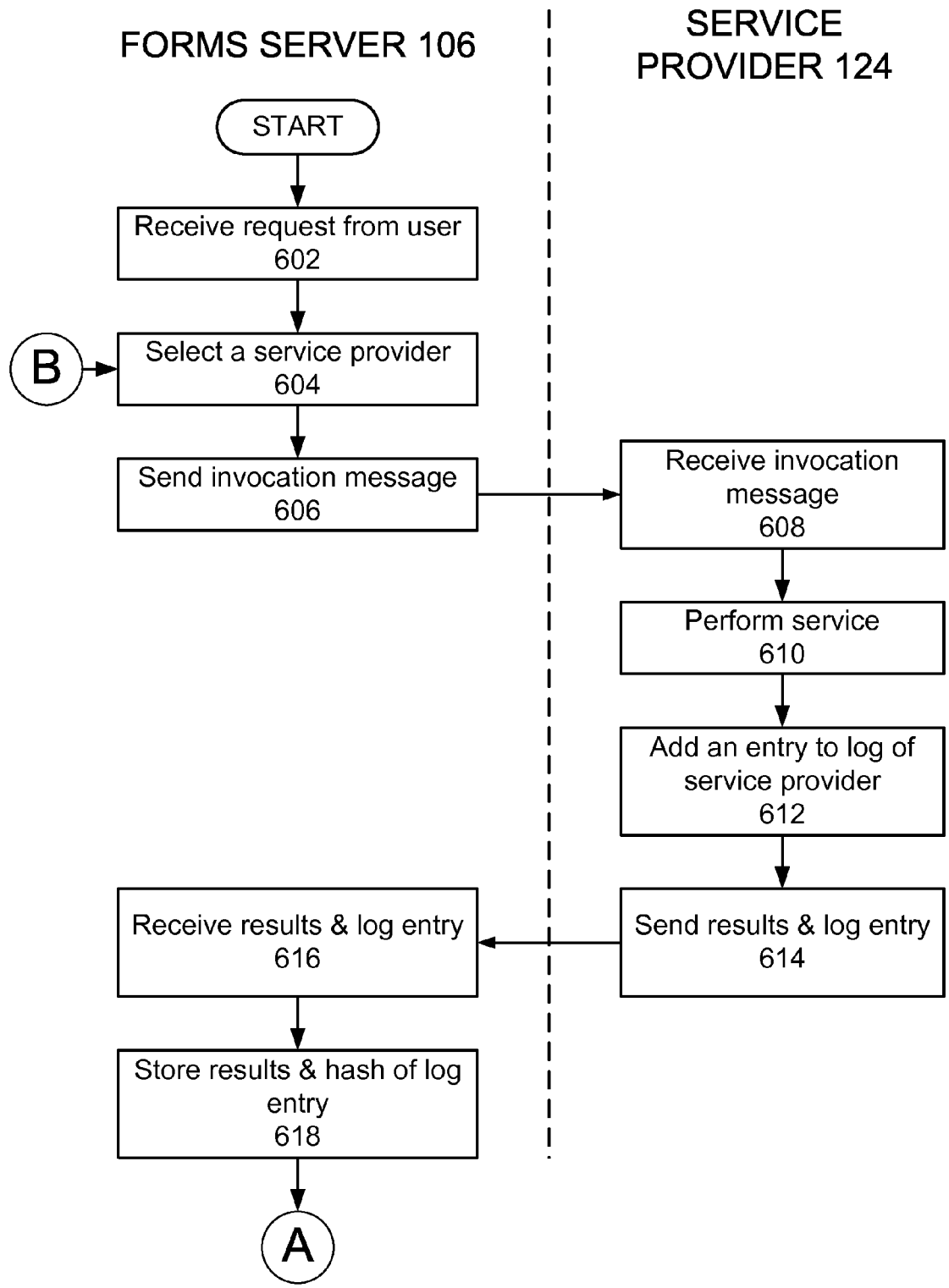
FIGS. 6A and 6B are flowcharts of an embodiment of a method for using a service provider to perform a transaction in accordance with the present invention.

Referring now to FIGS. 6A, 6B and 7A-7E, an embodiment of a method for using a service provider 124 to perform a transaction in accordance with the present invention is described. Referring now to FIG. 6A, the method begins by receiving 602 a request from a user. In one embodiment described above, this is receiving a compound document 400 by the paper-like forms server 106. In other embodiments, the request is a message received from a portable computing device 102 by the paper-like forms server 106 including the information necessary to perform the transaction. Those skilled in the art will recognize that in other embodiments a transaction template 410 may be invoked on a compound document 400 at any time. Actions such as turning a page, powering off a portable computing device 102, writing on a page and pausing for a threshold time, or a direct user button press or checkbox item could all be used to invoke processing. A compound document 400 might contain metadata 406 specifying that any of the above actions would trigger a particular transaction template 410. Transactions templates are assumed operate sequentially.

Next, the central scheduler 208 of the paper-like forms server 106 selects 604 a service provider 124. The central scheduler 208 chooses a service provider 124 based on the input type, the output type and the preferred vendor. In one embodiment, the preferred service provider is simply specified as a part of the transaction template 410. In another embodiment, the paper-like forms server 106 chooses the lowest price service provider 124 from the list of all service providers 124a-n whose input type and output types match the specified transaction. In a third embodiment, the central scheduler 208 chooses a service provider 124 based on some stored rating of service quality. In another embodiment, a plurality of service providers 124a-n are chosen, and the results of the plurality of service providers 124a-n are compared for quality. For example, a service may be one that converts the base page image to optical character recognized (OCR) text.

Figure 7A:
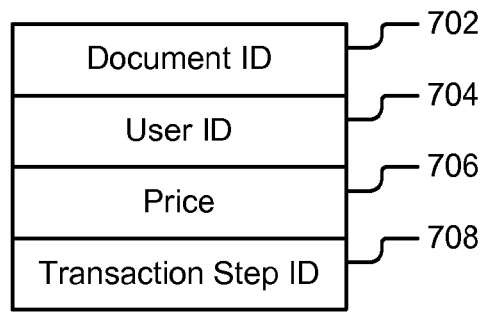
FIGS. 7A-7E are diagrams of messages and log entries in accordance with the present invention.

Next, the method creates an invocation message and sends 606 the invocation message to the service provider 124 selected in step 604. Referring now also to FIG. 7A, one embodiment for an invocation message is shown. The invocation message includes a document identifier (ID) 702, a user identifier (ID) 704, a price 706 and the transaction step identifier (ID) 708. The document ID 702 is a filename or a location at which the document or image upon which the service provider 124 is to act can be retrieved. In another embodiment, the document ID 702 is actually the document itself. The user ID is an identifier for the device that requested the transaction. In one embodiment, this user ID is the unique identifier 308 of portable computing device 102 that initiated the request 602. The price 706 is the price that the service provider 124 will be paid to perform the transaction. The transaction step ID 708 is a unique identifier for the transaction step. In most cases the transaction step ID 708 is the same identifier used in the transaction template 410.

Figure 7B:
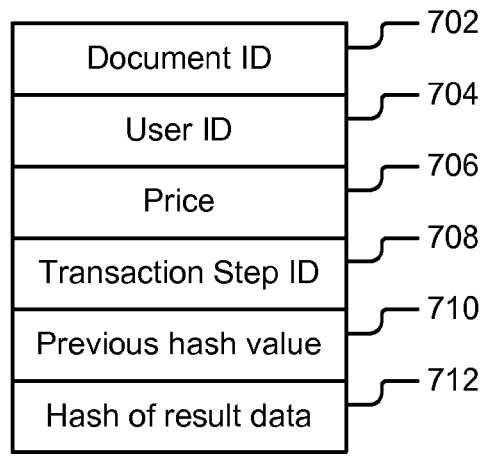

The invocation message is received 608 at the service provider 124. The service provider 124 determines from the invocation message the service that is to be performed, and performs 610 that service. The service provider 124 adds 612 an entry to its local log. For example, the logging module 314 adds a log entry reflecting completion of the service in the local log of the service provider 124. Each service provider 124 has a local log of transactions performed by that service provider 124. Referring now also to FIG. 7B, an example of a service transaction log entry is shown. The service transaction log entry includes the document ID 702, the user ID 704, the price 706, the transaction step ID, a previous hash value 710 and a hash of the result data 712. The document ID 702, the user ID 704, the price 706 and the transaction step ID are the same as described above with reference to FIG. 7A. The previous hash value 710 is the hash value of the prior log entry in the local log of the service provider 124. The hash of the result data 712 is a hash calculation of the results from this particular transaction. By including the hash value of the prior log entry, this information can be used at a later time and examined for verification as has been described above by comparison with the other entangled logs entries. In another embodiment, the service transaction log entry also includes a hash of the document or perhaps multiple hashes of portions of the document. The service provider 124 sends 614 results of the transaction and the log entry to the paper-like forms server 106.

Figure 6B:
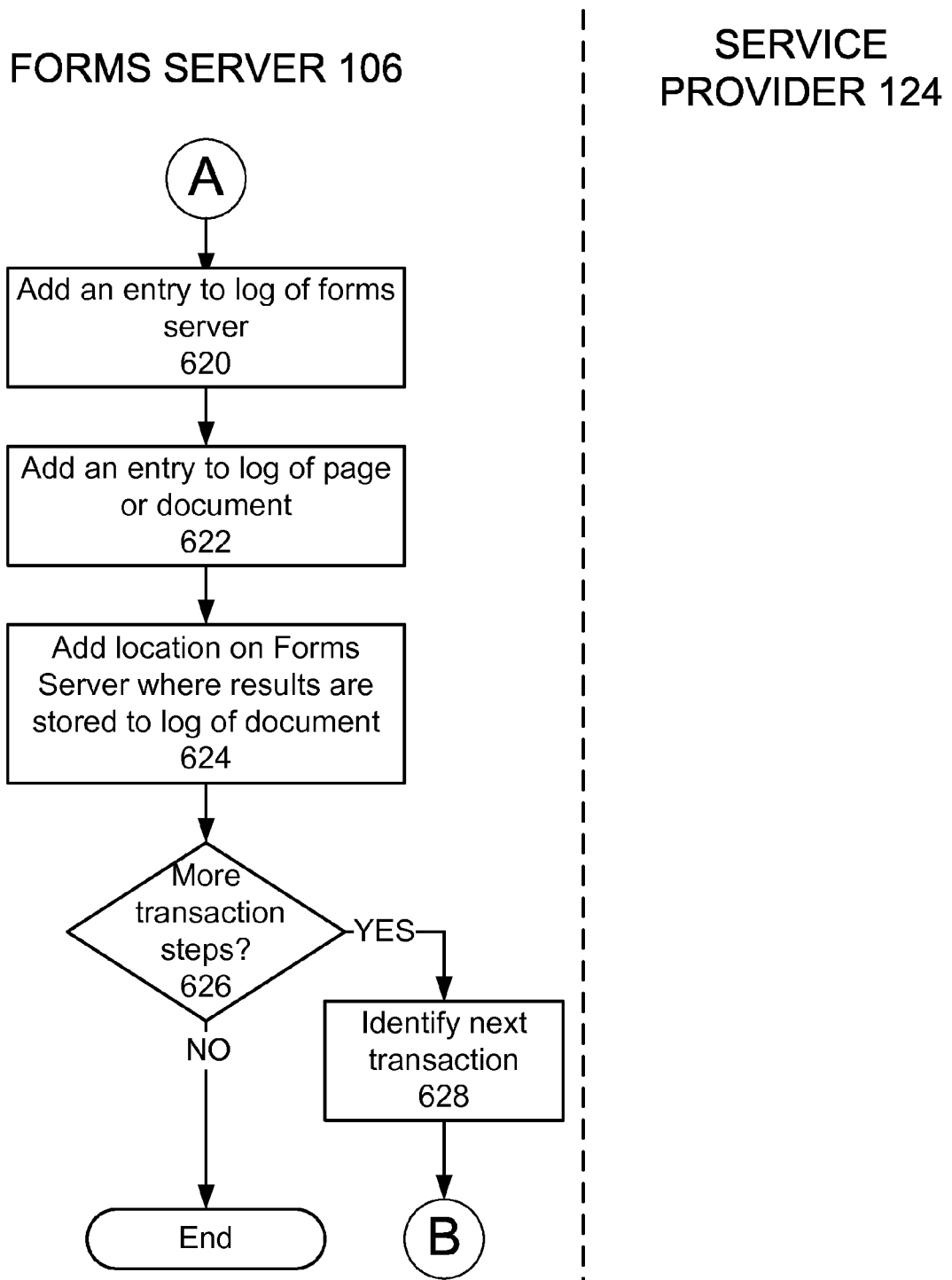
Figure 7C:
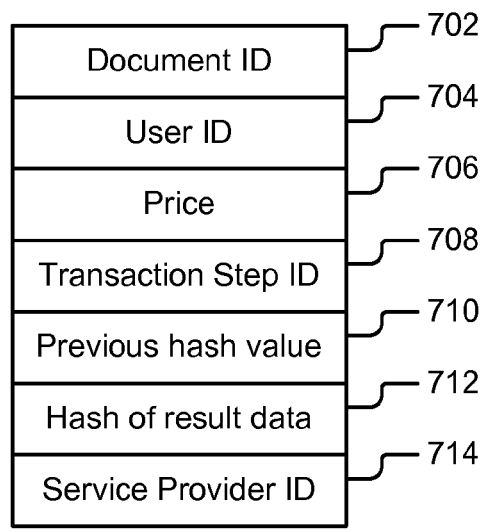

The results of the transaction and the log entry are received 616 by the paper-like forms server 106. The central scheduler 208 stores 618 the results and sends the log entry to the logging module 210. The logging module 210 creates a global transaction log entry from the received service transaction log entry. The logging module 210 then adds 620 this global transaction log entry to the log of the paper-like forms server 106 as shown in FIG. 6B. The paper-like forms server 106 maintains a central log of all service transactions. Referring now also to FIG. 7C, an embodiment for the global transaction log entry is shown. The global transaction log entry comprises a document ID 702, a user ID 704, a price 706, a transaction step ID 708, a previous hash value 710, a hash of the result data 712 and a service provider identifier (ID) 714. The document ID 702, the user ID 704, the price 706, the transaction step ID 708 and the hash of the result data 712 have been described above and are the same as the received service transaction log entry. The service provider identifier (ID) 714 is a unique string identifier for the service provider 124 that produce the results and sent the service transaction log entry. The previous hash value 710 is the hash value of the previous entry in the global transaction log of the paper-like forms server 106. The logging module 210 copies this information from the received service transaction log entry and calculates the hash value of the previous entry in the global transaction log.

Figure 7D:
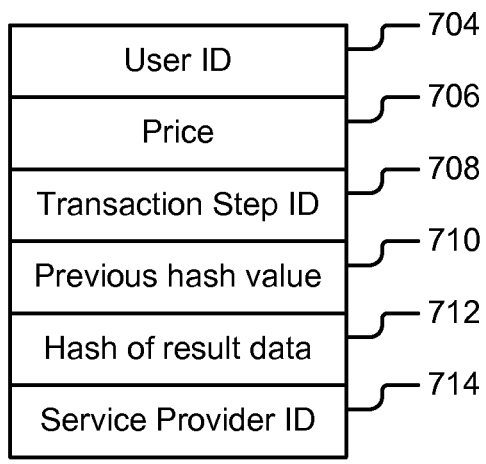
Figure 7E:
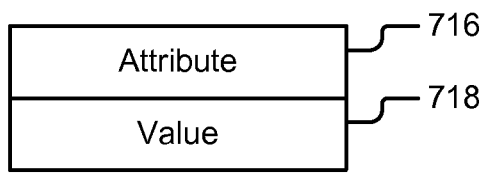

Next, the central scheduler 208 adds 622 an entry to the log of the page metadata 404 or document metadata 406. Referring now also to FIG. 7D, an embodiment for the document transaction log entry is shown. The document transaction log entry includes the user ID 704, the price 706, the transaction step ID 708, the previous hash value 710, the hash of the result data 712 and the service provider identifier (ID) 714. The user ID 704, the price 706, the transaction step ID 708, the hash of the result data 712 and the service provider identifier (ID) 714 have a similar form and functionality to like components described above with reference to FIG. 7C. However, the previous hash value 710 is a hash value of the prior entry in the log of the page metadata 404 or document metadata 406. Then the central scheduler 208 then adds 624 the location on the paper-like forms server 106 where the results from the transaction service 124 are stored to the metadata 406 of the compound document 400. For example, for each output type provided by the service provider 124, the central scheduler 208 writes a log entry into the document's metadata log 406, specifying an attribute/value pair whose attribute is the role specified, and whose value is the set of data returned by the transaction service 124. Because the logs exchange hash information, this method of service invocation provides entanglement of the various logs, allowing for dispute resolution in several key areas. This method allows the system to guarantee that a transaction was performed, verify that the data in the compound document 400 match the transaction result, and guarantee that the central scheduler 208 has correctly performed the steps in the transaction template 410 with appropriate service providers 124.

The method continues by determining 626 whether there are additional transaction steps in the transaction template 410. If so, the central scheduler 208 identifies 628 the next transaction and continues with step 604 of FIG. 6A. The process then repeat steps 604 to step 626. On the other hand, if there are no additional transaction step the method is complete and ends.

Figure 8:
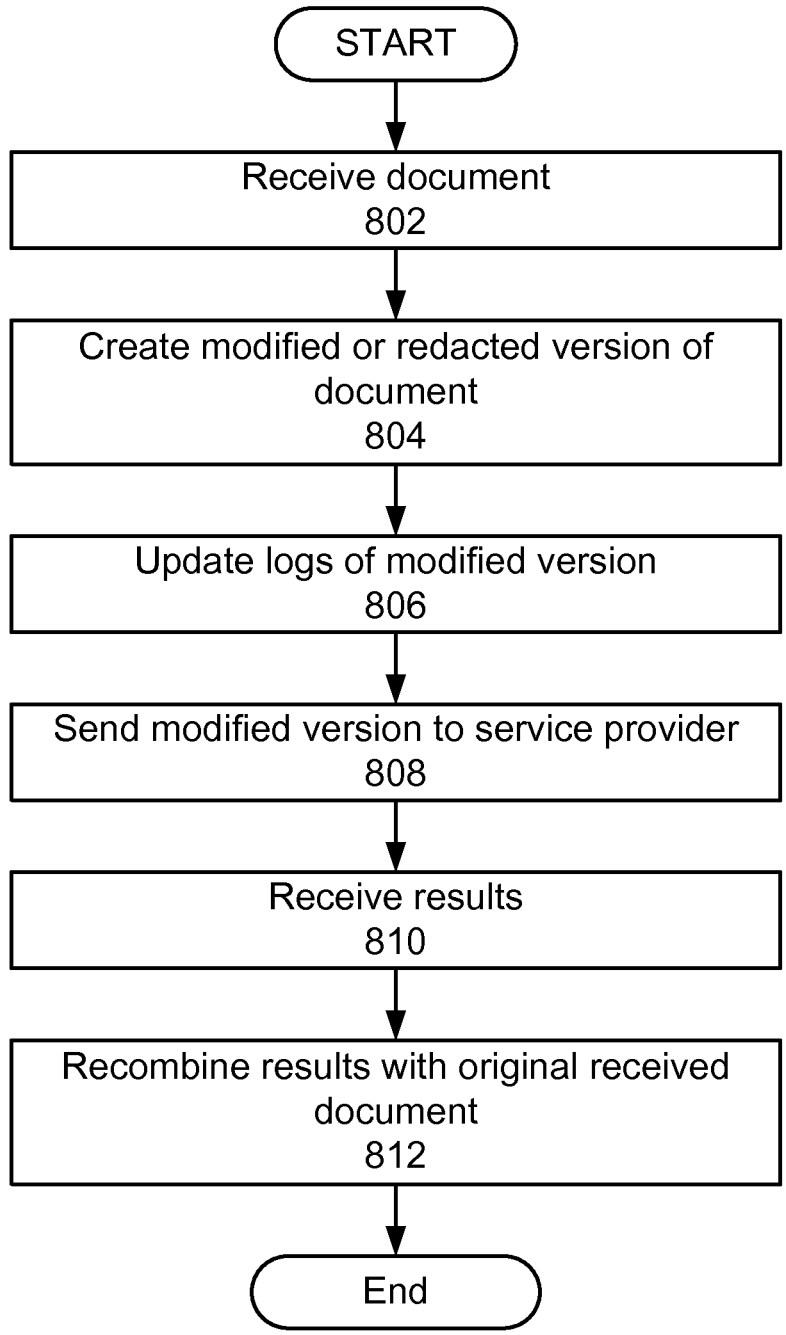
FIG. 8 is a flowchart of an embodiment of a method for modifying a document for processing by a service provider in accordance with the present invention.

Referring now to FIG. 8, a method for modifying or redacting a compound document 400 before sending it to a service provider 124 for processing will be described. In certain circumstances there is a need to minimize information disclosed to other parties. Because documents can contain highly sensitive information, it is important to guarantee that this information is not inappropriately retained or transmitted by the service providers 124 or paper-like forms server 106. A modified or redacted version of the compound document 400 is created with minimal information of only the types requested by the transaction step definition. In this case, each log entry of the document 400 has its attribute and value pairing examined, and only those entries which match the specified input types are made available to the service provider 124. This method begins with the central server 208 of the paper-like forms server 106 receiving 802 a compound document 400. The central server 208 interacts with the modification module 216 to create 804 a modified or redacted version of the compound document 400. For example, the modified or redacted version of the compound document 400 is created by identifying information needed for the next transaction step and removing all other information. Next the modification module 216 updates 806 the logs of the modified version of the compound document 400. In such a case, the page and document metadata logs 404, 406 are rewritten to form a correct log. The modified document version contains a new and consistent log containing the subset of items requested by the service provider 124. The central scheduler 208 writes an entry in the original document's log, showing that a new redacted document was created and including the hash of the final log entry of the redacted document. Next, the method sends 808 the modified version of the compound document 402 to the service provider 124. The service provider 124 processes the modified version and returns results. The results are received 810 by the central scheduler 208 of the paper-like forms server 106. The central server 208 then recombines received results with the original document. In one embodiment, once the service provider 124 has completed the service tasks, those entries whose types match the outputs defined by the service from the redacted document's logs are appended to the page and document logs 404, 406 of the original. The page logs 404 are appended to the corresponding page logs 404 of the original, and the redacted document log 406 is appended to the document log 406 of the original. If new pages are added by the service provider 124, then those pages and any logs are added to the original document. The value of this approach is that the log entanglement properties are preserved, but minimal information is disclosed to the service provider 124.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

The invention claimed is:

1. A computer-implemented method for paper-like form processing, the method comprising:
   receiving, with one or more processors, a compound document including a transaction template having a list of service transactions, each service transaction including an input content type and an output content type associated with completing the service transaction;
   identifying, with the one or more processors, from the transaction template a first transaction to be performed from the list of service transactions;
   identifying, with the one or more processors, at least a first service provider and a second service provider from a plurality of service providers to perform the first transaction based on the input content type and the output content type of the first transaction respectively matching an input content type and an output content type of the first service provider and the input content type and the output content type of the first transaction respectively matching an input content type and an output content type of the second service provider;
   sending the compound document to the identified first service provider to complete the first transaction;
   monitoring, with the one or more processors, a status from the identified first service provider as to whether the identified first service provider succeeded or failed to complete the first transaction;
   responsive to the monitored status indicating that the identified first service provider succeeded in completing the first transaction, receiving results as a product of completing the first transaction at the identified first service provider and adding an entry to a global transaction log indicating completion of the first transaction; and
   responsive to the monitored status indicating that the identified first service provider failed to complete the first transaction, sending the compound document to the identified second service provider to complete the first transaction.

2. The method of claim 1, further comprising:
   identifying a billing code associated with the first transaction in the transaction template; and
   determining a price for performing the first transaction based on the billing code associated with the first transaction.

3. The method of claim 2 further comprising:
   identifying at least the first service provider and the second service provider as lowest price service providers based on the determined price for performing the first transaction.

4. The method of claim 1 wherein the compound document is created using at least one received image at one from the group of a portable computing device, a computer and a paper-like forms server.

5. The method of claim 1 wherein the transaction template is stored as document metadata in the compound document.

6. The method of claim 1 wherein responsive to the monitored status indicating that the identified first service provider failed to complete the first transaction, assigning the identified first service provider a rating indicating a quality of service.

7. The method of claim 1 wherein sending the compound document to the identified first service provider comprises sending the entire compound document.

8. The method of claim 1 wherein sending the compound document to the identified first service provider comprises sending a first portion of the compound document to the identified first service provider, the method further comprising:
   storing a copy of the compound document in its original form;
   modifying the compound document by removing a second portion that is used in a previous transaction; and
   sending the modified compound document to the first service provider.

9. The method of claim 1 wherein the identified first service provider performs the first transaction and adds an entry to a local transaction log indicating completion of the first transaction.

10. The method of claim 1 further comprising:
    adding the results from performing the first transaction to the compound document; and
    updating a transaction status in metadata of the compound document.

11. The method of claim 10 further comprising adding an entry to a document transaction log of the compound document indicating completion of the first transaction.

12. The method of claim 1 wherein the entry to the global transaction log includes a hash of a previous log entry in the global transaction log.

13. A system for paper-like form processing, the system comprising:
    one or more processors;
    a central scheduler stored on a memory and executable by the one or more processors, the central scheduler configured to receive a compound document including a transaction template having a list of service transactions, each service transaction including an input content type and an output content type associated with completing the service transaction, to identify from the transaction template a first transaction to be performed from the list of service transactions, to identify at least a first service provider and a second service provider from a plurality of service providers to perform the first transaction based on the input content type and the output content type of the first transaction respectively matching an input content type and an output content type of the first service provider and the input content type and the output content type of the first transaction respectively matching an input content type and an output content type of the second service provider, to send the compound document to the identified first service provider to complete the first transaction and, to receive a status from the identified first service provider as to whether the identified first service provider succeeded or failed to complete the first transaction, in response to the status that the identified first service provider succeeded in completing the first transaction, receiving results as a product of completing the first transaction at the identified first provider;
    a service provider manager and rater stored on the memory and executable by the one or more processors, the service provider manger and rater coupled to the central scheduler and configured to monitor the status from the identified first service provider as to whether the identified first service provider succeeded or failed to complete the first transaction;
    a logging module stored on the memory and executable by the one or more processors, the logging module coupled to the central scheduler and configured to create and maintain a global transaction log of transactions processed by the central scheduler and, responsive to the monitored status indicating that the identified first service provider succeeded in completing the first transaction, to add an entry to the global transaction log indicating completion of the transaction; and
    a retry module stored on the memory and executable by the one or more processors, the retry module coupled to the central scheduler and configured, responsive to the monitored status indicating that the identified first service provider failed to complete the first transaction, to send the compound document to the identified second service provider to complete the first transaction.

14. The system of claim 13 comprising a billing module, stored on the memory and executable by the one or more processors, the billing module configured to identify a billing code associated with the first transaction in the transaction template and to determine a price for performing the first transaction based on the billing code associated with the first transaction.

15. The system of claim 14 wherein the central scheduler is configured to identify at least the first service provider and the second service provider as lowest price service providers based on the determined price for performing the first transaction.

16. The system of claim 13 wherein the central scheduler determines a second transaction by retrieving the transaction template from the compound document and determining a next uncompleted transaction listed in the transaction template.

17. The system of claim 13 wherein the central scheduler determines the first service provider from the plurality of service providers using metadata from the compound document.

18. The system of claim 13 comprising a document transfer module for sending and receiving the compound document, and the document transfer module is an email server.

19. The system of claim 13 wherein the logging module creates new log entries that include a hash of a prior log entry.

20. The system of claim 13 wherein the logging module stores the global transaction log of transactions processed by the central scheduler in a location that is accessible via public networks.

21. The system of claim 13 comprising a portable computing device having a second logging module for creating and maintaining a local transaction log of transactions processed by the portable computing device.

* * * * *